United States Patent
Flanigan et al.

(10) Patent No.: US 8,035,547 B1
(45) Date of Patent: Oct. 11, 2011

(54) SYSTEM AND METHOD OF ASSISTED AERIAL NAVIGATION

(75) Inventors: Daniel Keegan Flanigan, Overland Park, KS (US); Jay R. Flatland, Olathe, KS (US); Merlin R. James, Olathe, KS (US); Eric D. Schlef, Wellsville, KS (US)

(73) Assignee: Garmin Switzerland GmbH (CH)

( * ) Notice: Subject to any disclaimer, the term of this patent is extended or adjusted under 35 U.S.C. 154(b) by 280 days.

(21) Appl. No.: 12/049,924

(22) Filed: Mar. 17, 2008

(51) Int. Cl.
*G05D 1/00* (2006.01)
*G01S 7/04* (2006.01)
*G01C 13/00* (2006.01)
*G01S 7/00* (2006.01)

(52) U.S. Cl. .......... 342/36; 342/33; 342/61; 342/63; 342/175; 342/176; 342/195; 244/3.1; 244/3.11; 701/1; 701/3; 701/14; 701/200; 701/207; 701/213; 340/945; 340/971; 340/979

(58) Field of Classification Search .......... 244/3.1–3.3, 244/135 R, 135 A, 75.1, 76 R, 175, 183–188; 89/1.11; 342/29–52, 61–66, 118–123, 165–184, 342/195, 357.01–357.17, 352, 357.2–357.22, 342/357.28–357.3; 701/1–18, 200, 207, 701/209, 213–216, 300, 301, 208, 211; 340/945–980; 341/50, 76; 345/418–427, 345/581, 618; 382/232, 243
See application file for complete search history.

(56) References Cited

U.S. PATENT DOCUMENTS

| | | | |
|---|---|---|---|
| 4,368,517 A | | 1/1983 | Lovering |
| 5,357,263 A | * | 10/1994 | Fischer et al. ............... 340/975 |
| 5,420,582 A | * | 5/1995 | Kubbat et al. ............... 340/974 |
| 5,754,430 A | * | 5/1998 | Sawada ........................ 701/209 |
| 5,786,773 A | * | 7/1998 | Murphy ........................ 340/947 |
| 5,798,713 A | * | 8/1998 | Viebahn et al. ............... 340/974 |
| 5,838,262 A | * | 11/1998 | Kershner et al. ............. 340/945 |
| 5,995,903 A | | 11/1999 | Smith et al. ................... 701/211 |
| 6,021,374 A | * | 2/2000 | Wood ............................ 701/301 |
| 6,054,937 A | * | 4/2000 | Von Viebahn et al. ........ 340/961 |
| 6,055,477 A | * | 4/2000 | McBurney et al. ........... 701/207 |
| 6,272,404 B1 | * | 8/2001 | Amano et al. .................... 701/3 |
| 6,320,579 B1 | * | 11/2001 | Snyder et al. ................. 345/419 |
| 6,496,760 B1 | * | 12/2002 | Michaelson et al. ............ 701/3 |
| 6,573,841 B2 | | 6/2003 | Price ............................ 340/963 |
| 6,686,850 B2 | * | 2/2004 | Hausmann .................... 340/967 |
| 6,753,841 B2 | | 6/2004 | Kai et al. |
| 6,865,477 B2 | * | 3/2005 | Nicosia et al. ................ 701/207 |
| 6,879,886 B2 | * | 4/2005 | Wilkins et al. .................... 701/3 |
| 6,972,696 B2 | * | 12/2005 | Rogers et al. ................. 340/971 |
| 6,985,091 B2 | | 1/2006 | Price ............................ 340/975 |

(Continued)

OTHER PUBLICATIONS

Avidyne Press Release—Avidyne Unveils Synthetic Vision and Enhanced Vision, Jul. 28, 2008.

(Continued)

*Primary Examiner* — Bernarr E Gregory

(74) *Attorney, Agent, or Firm* — Samuel M. Korte

(57) ABSTRACT

A system and method of providing aerial navigation. Techniques are described for receiving global positioning system data, receiving local positioning system data such as instrument landing system data, generating a virtual target flight path using the global positioning system data and the local positioning system data, and presenting a virtual target flight path indicator corresponding to the virtual target flight path. In one implementation, the system includes a user interface, a global positioning component, a local positioning component, and a processing system.

30 Claims, 28 Drawing Sheets

U.S. PATENT DOCUMENTS

| | | | | |
|---|---|---|---|---|
| 7,010,398 | B2 | 3/2006 | Wilkins, Jr. et al. | 701/3 |
| 7,161,527 | B2 * | 1/2007 | Vacanti | 342/121 |
| 7,239,311 | B2 * | 7/2007 | Dunn et al. | 345/419 |
| 7,257,469 | B1 * | 8/2007 | Pemble | 701/3 |
| 7,309,048 | B2 * | 12/2007 | von Thal et al. | 244/135 A |
| 7,365,652 | B2 * | 4/2008 | Scherbarth | 340/974 |
| 7,528,746 | B2 * | 5/2009 | Adachi | 341/76 |
| 7,539,348 | B2 * | 5/2009 | Adachi | 382/243 |
| 7,546,183 | B1 * | 6/2009 | Marcum | 701/17 |
| 7,599,766 | B2 * | 10/2009 | Ardila et al. | 701/3 |
| 7,603,209 | B2 * | 10/2009 | Dwyer et al. | 701/14 |
| 7,634,335 | B2 * | 12/2009 | Bitar et al. | 701/8 |
| 2003/0132860 | A1 * | 7/2003 | Feyereisen et al. | 340/973 |
| 2003/0222887 | A1 * | 12/2003 | Wilkins et al. | 345/618 |
| 2004/0015274 | A1 * | 1/2004 | Wilkins et al. | 701/3 |
| 2004/0026573 | A1 * | 2/2004 | Andersson et al. | 244/183 |
| 2007/0106433 | A1 | 5/2007 | He | 701/16 |

OTHER PUBLICATIONS

Bailey, Randall E., NASA Langley Research Center, Synthetic Vision System Research, Feb. 14, 2006.

Glaab, Louis J. et al., Flight Test Comparison of Synthetic Vision display Concepts at Dallas/Fort Worth International Airport, May 2003.

Hughes, David, Virtual VFR for Bizjets, Aviation Week & Space Technology, Oct. 16, 2006.

Instrument Landing System from http://en.wikipedia.org/wiki/Instrument_Landing_System, printed Jul. 8, 2009.

Kramer, Lynda J., et al., Synthetic Vision Systems—Operational Considerations Simulation Experiment, published prior to Mar. 17, 2008.

Van West, Jeff, Synthetic Vision: VistaNav Rules, The Aviation Consumer, Oct. 2007.

Stubblefield, Terry et al., Synthetic Vision Systems Workshop, Operational Considerations, FAA, Feb. 2006.

Newman, Dick, A review of Pathway-in-the-Sky Displays, FAA, Feb. 2006.

Foster, Lowell, Part 23 Synthetic Vision Approval Approach, FAA, Feb. 2006.

Foster, Lowell, Synthetic Vision AC, Draft AC 23-26 Synthetic vision and Pathway Depictions on the Primary Flight Display, FAA, Feb. 2006.

Connor, Glenn, Vision Systems Technology, Discover Technology International, Oct. 2007.

Schiefele, Dr. Jens, et al., Systematic Generation and Evaluation of EVS/SVS Databases, Feb. 2006.

Chelton Pilot's Guide, 2005., Document 150-045240, Rev H; Chelton Flight Systems, Boise, Idaho, USA; copyright in the year 2005.

* cited by examiner

SYSTEM AND METHOD OF ASSISTED AERIAL NAVIGATION

BACKGROUND

Embodiments of the present invention relate to aerial navigation. More particularly, embodiments of the invention involve a system and method of assisted aerial navigation that enhances a pilot's situational awareness by presenting a virtual target flight path to the pilot during final landing approaches using data received from a local positioning system.

Landing an aircraft can be the most challenging stage of a flight, particularly in reduced visibility conditions, such as at night or in inclement weather. Thus, automated guidance systems such as the instrument landing system (ILS) have been developed to assist pilots when landing aircraft. The ILS is a ground-based system that provides guidance signals to an ILS receiver onboard aircraft that are approaching a runway, wherein onboard instrumentation indicates to pilots when they have deviated from a desired final approach path to the runway.

Unfortunately, the ILS suffers from various limitations. For example, the ILS provides a pair of indicators indicating to the pilot a degree to which the aircraft has deviated laterally and vertically from the desired final approach path. Because the ILS provides only an indication of a degree of deviation in each direction, the pilot is left to estimate how much correction is needed to align the aircraft with the desired final approach path. In such circumstances the pilot may overshoot or undershoot the desired final approach path in an effort to correct the deviations indicated by the ILS. Furthermore, the pilot must shift his or her focus between a first ILS indicator, a second ILS indicator, the runway, and possible other instrumentation present on the flight deck.

Accordingly, there is a need for an improved system of assisted aerial navigation that does not suffer from the limitations of the prior art.

SUMMARY

Embodiments of the present invention provide a distinct advance in the art of aerial navigation systems. More particularly, embodiments of the invention provide a system and method of assisted aerial navigation that enhances a pilot's situational awareness by presenting a virtual target flight path to the pilot during final landing approaches using data received from a local positioning system, such as an instrument landing system.

In various embodiments, the invention involves a method of assisted aerial navigation comprising receiving global positioning system data, receiving local positioning system data, generating a virtual target flight path using the global positioning system data and the local positioning system data, and presenting a virtual target flight path indicator corresponding to the virtual target flight path. The indicator may include a plurality of targets, each corresponding to a different geographic location of the virtual target flight path.

In some embodiments, the virtual target flight path is generated using the GPS data and navigational data retrieved from a navigational database. The virtual target flight path is then corrected by using the local positioning system data to identify errors in the virtual target flight path and to correct the errors.

In some embodiments, the method involves generating a virtual representation of a ground surface depicting actual ground features within a pilot's view, and generating an enlarged representation of a runway on the ground surface, wherein a size of the enlarged representation remains substantially constant as a distance to said runway changes.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
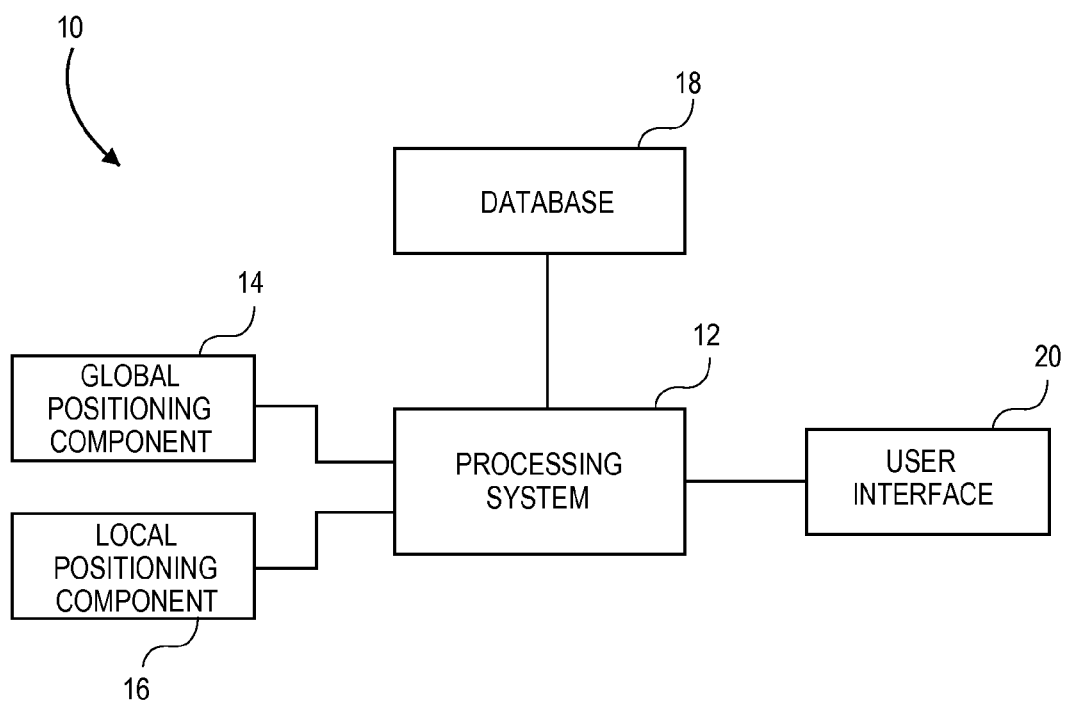
FIG. 1 is a bock diagram of an exemplary system for providing assisted aerial navigation according to various embodiments of the invention.
Figure 12:
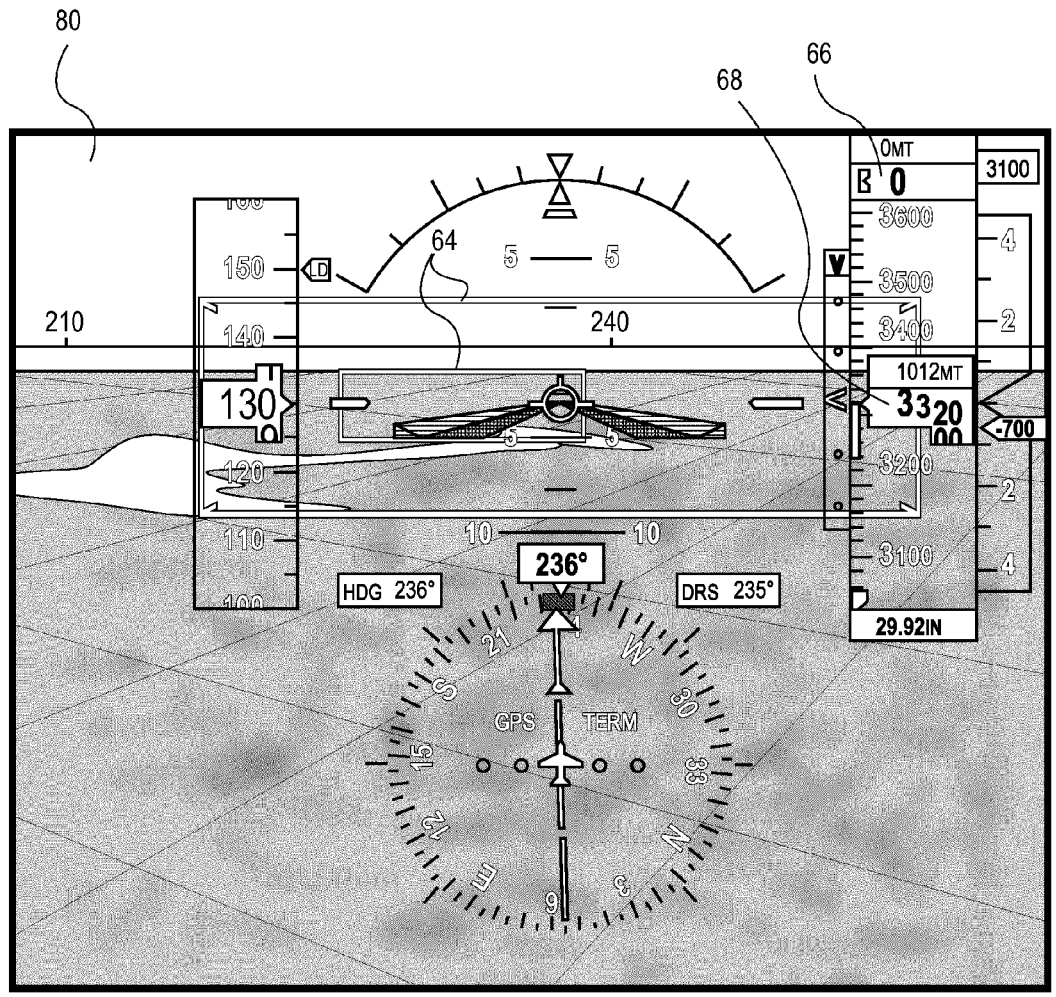
Figure 13:
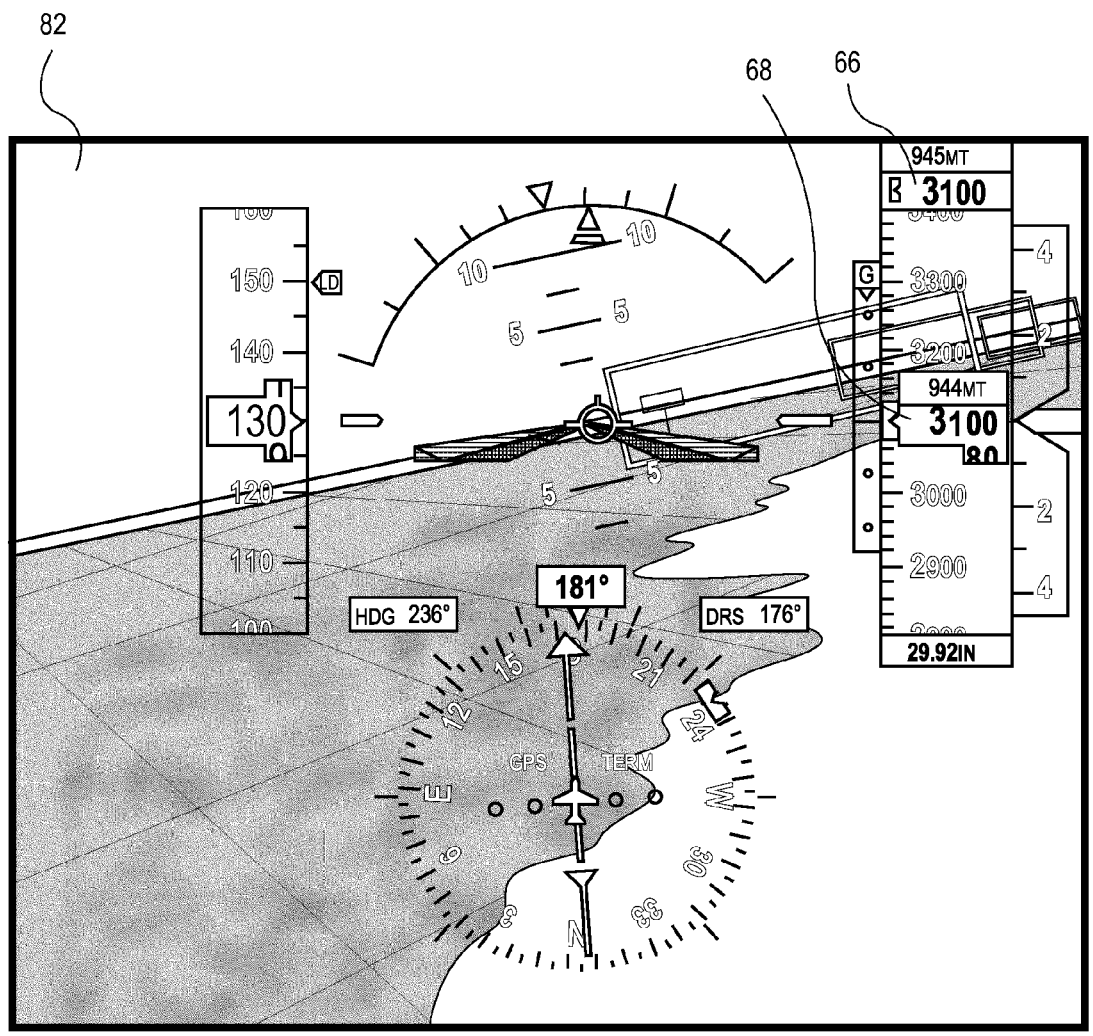
Figure 14:
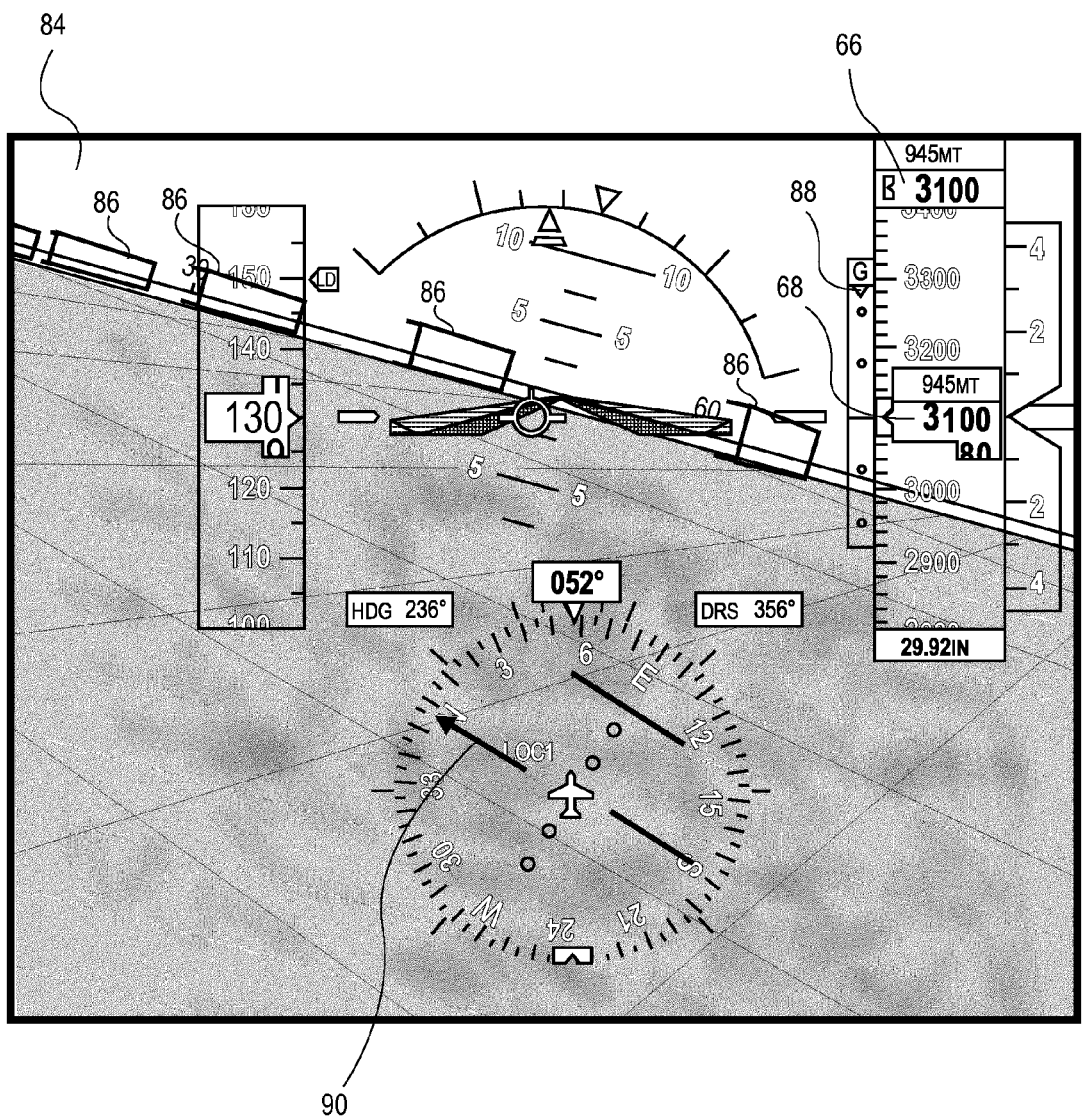
Figure 15:
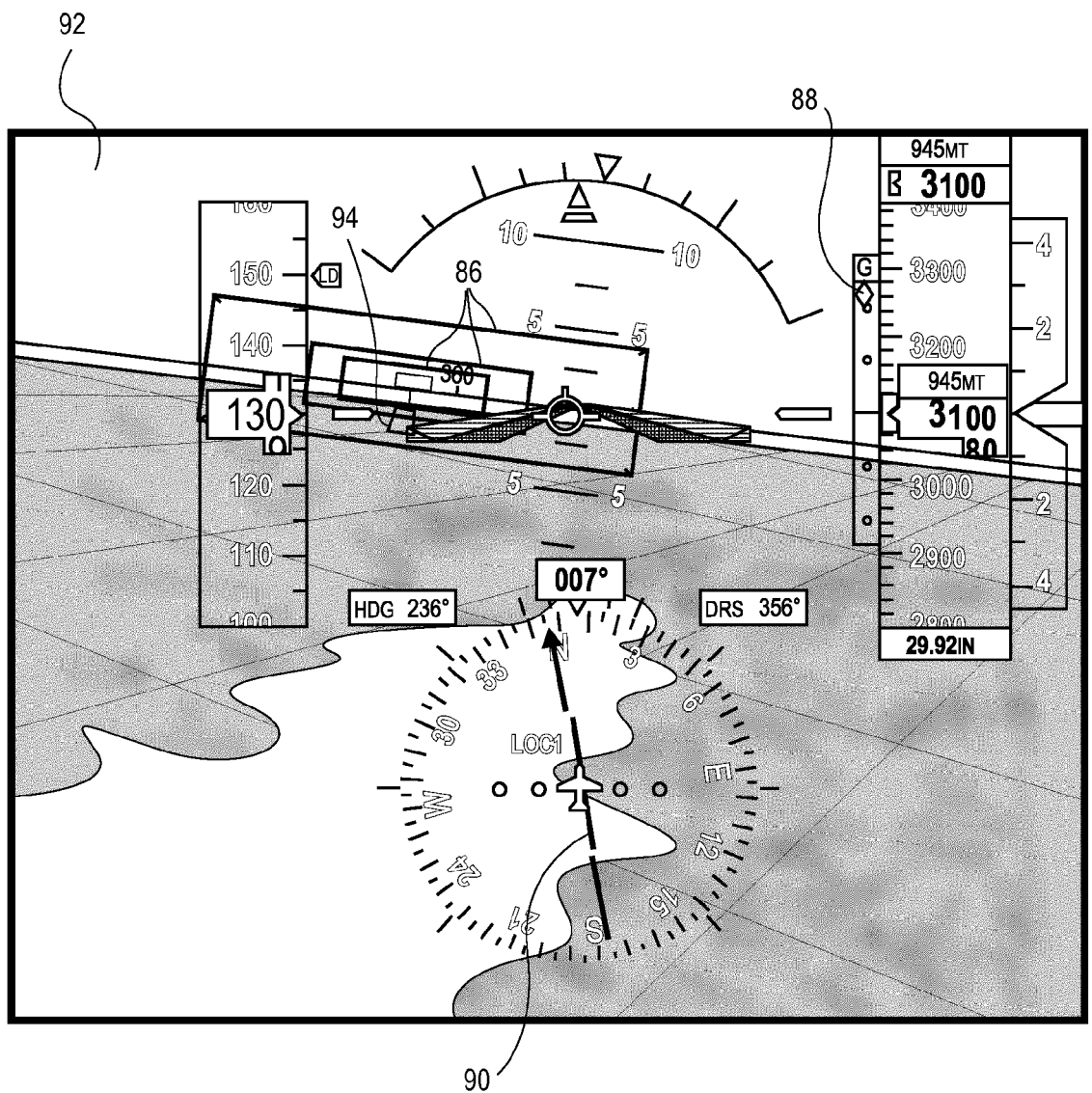
Figure 16:
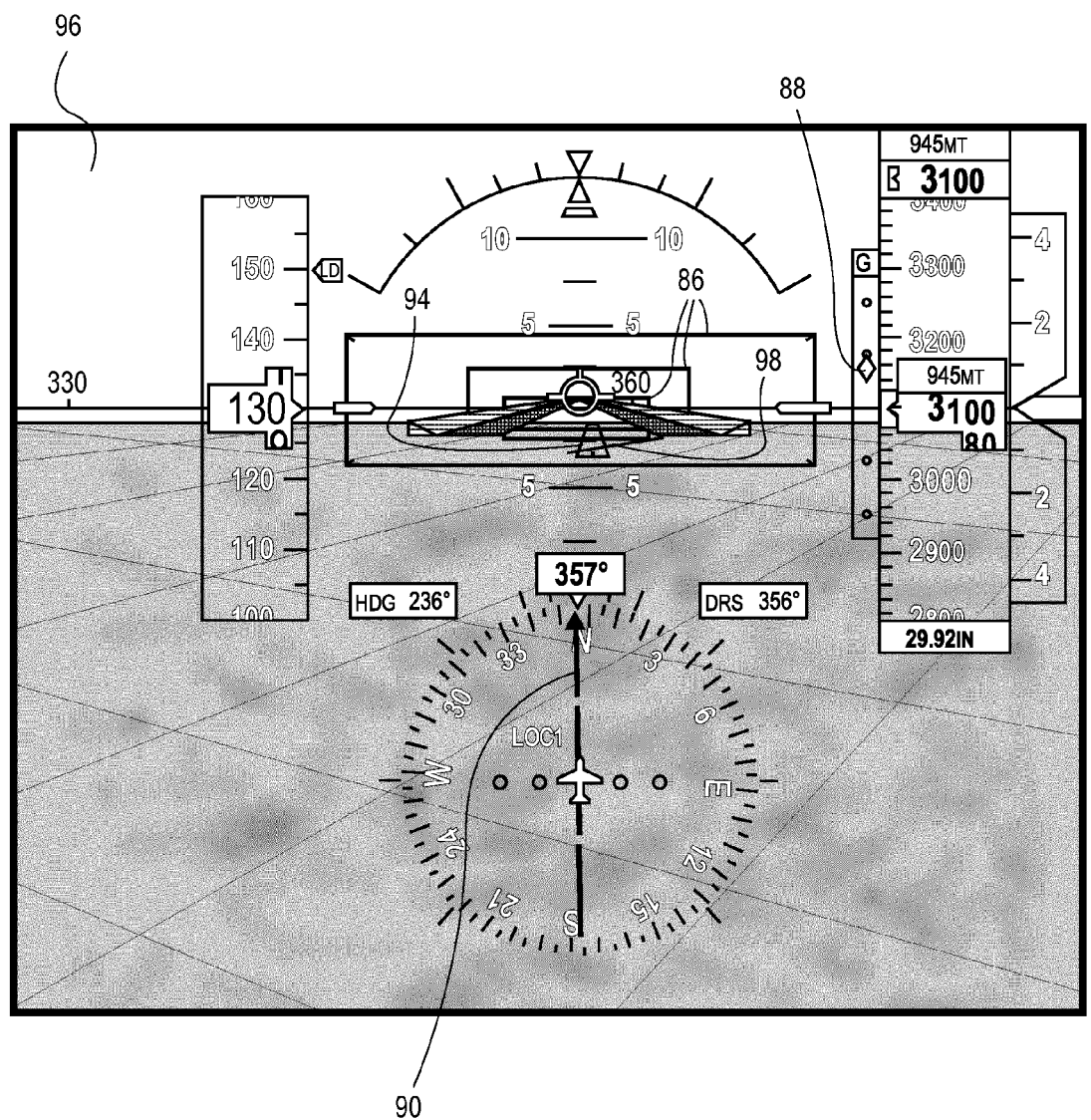
Figure 17:
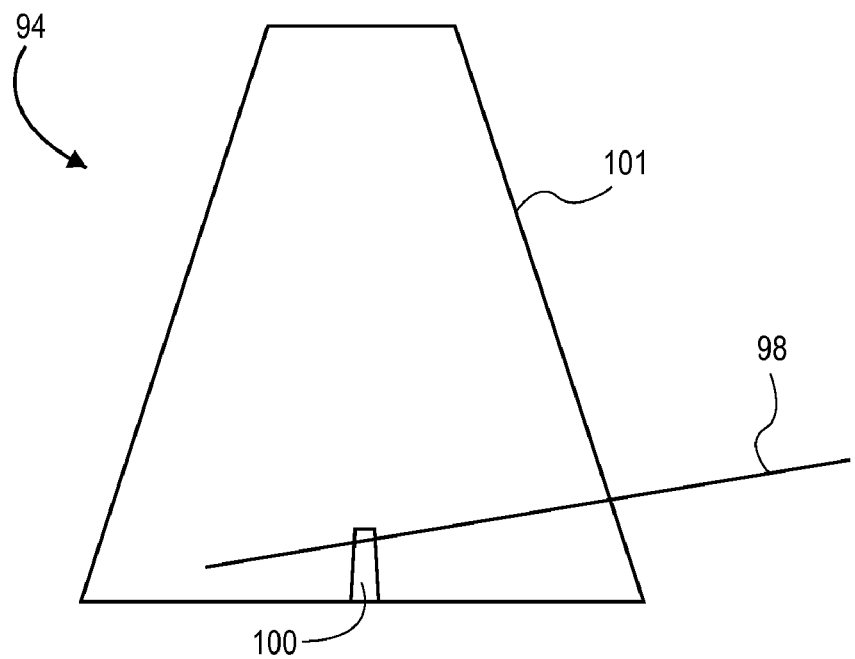
Figure 18:
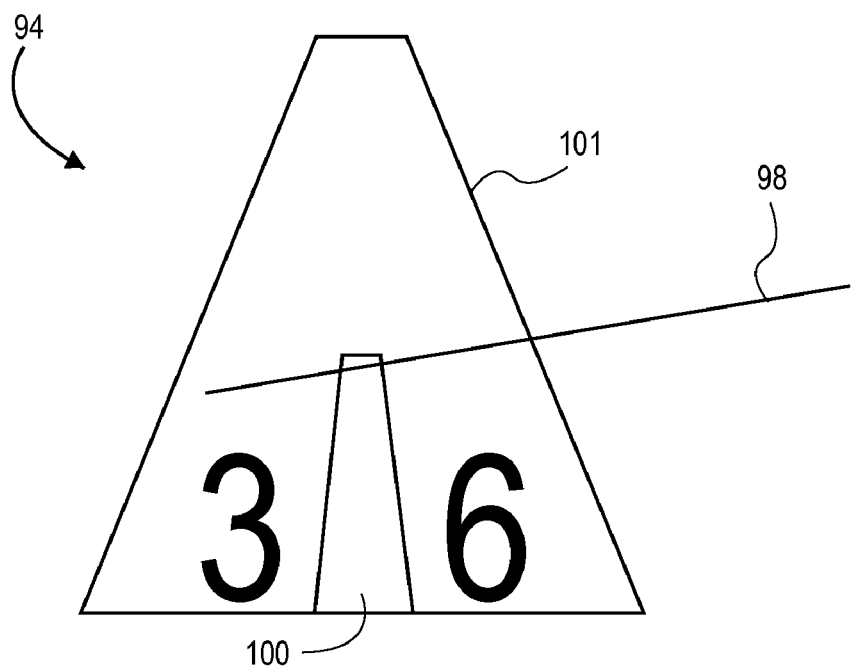
Figure 19:
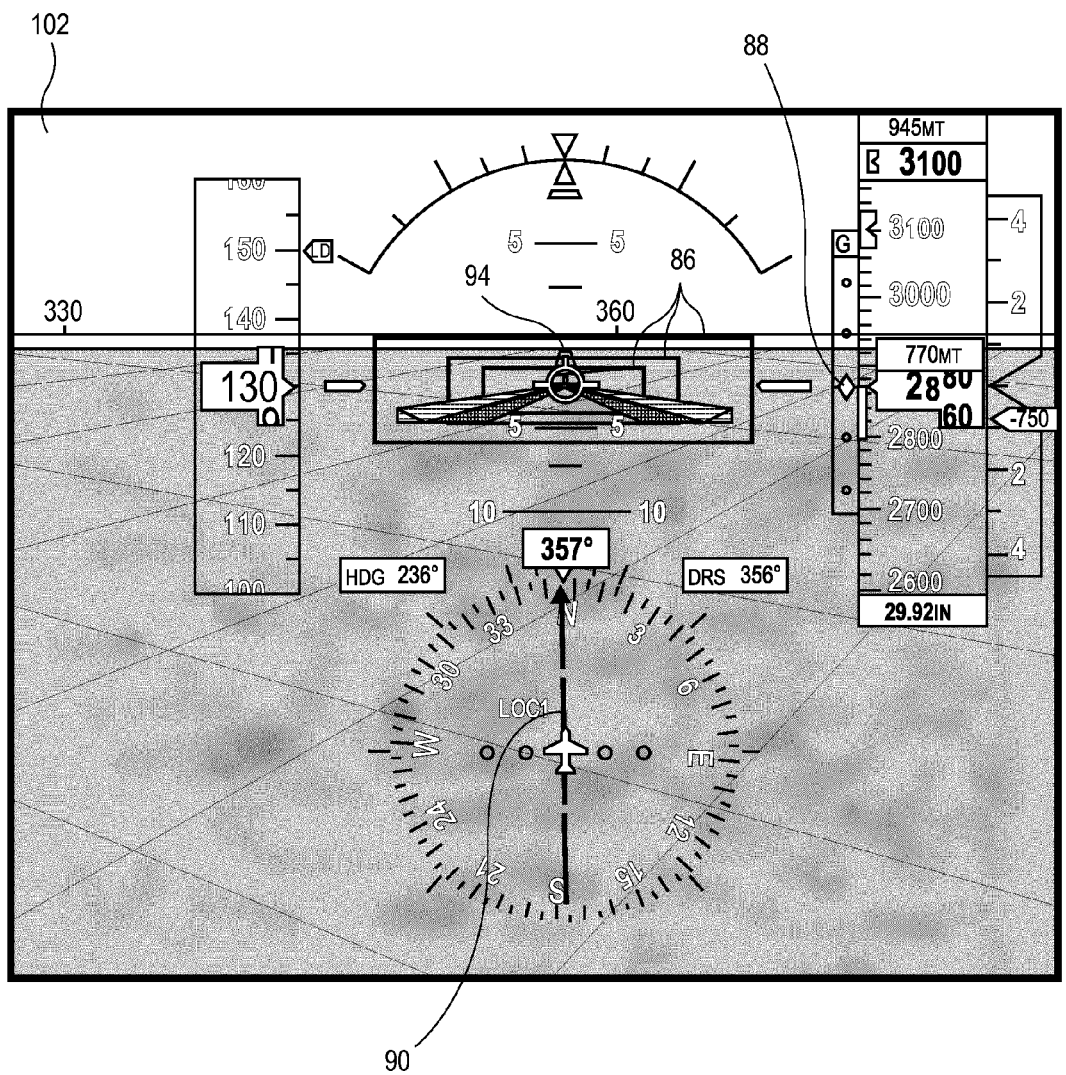
Figure 20:
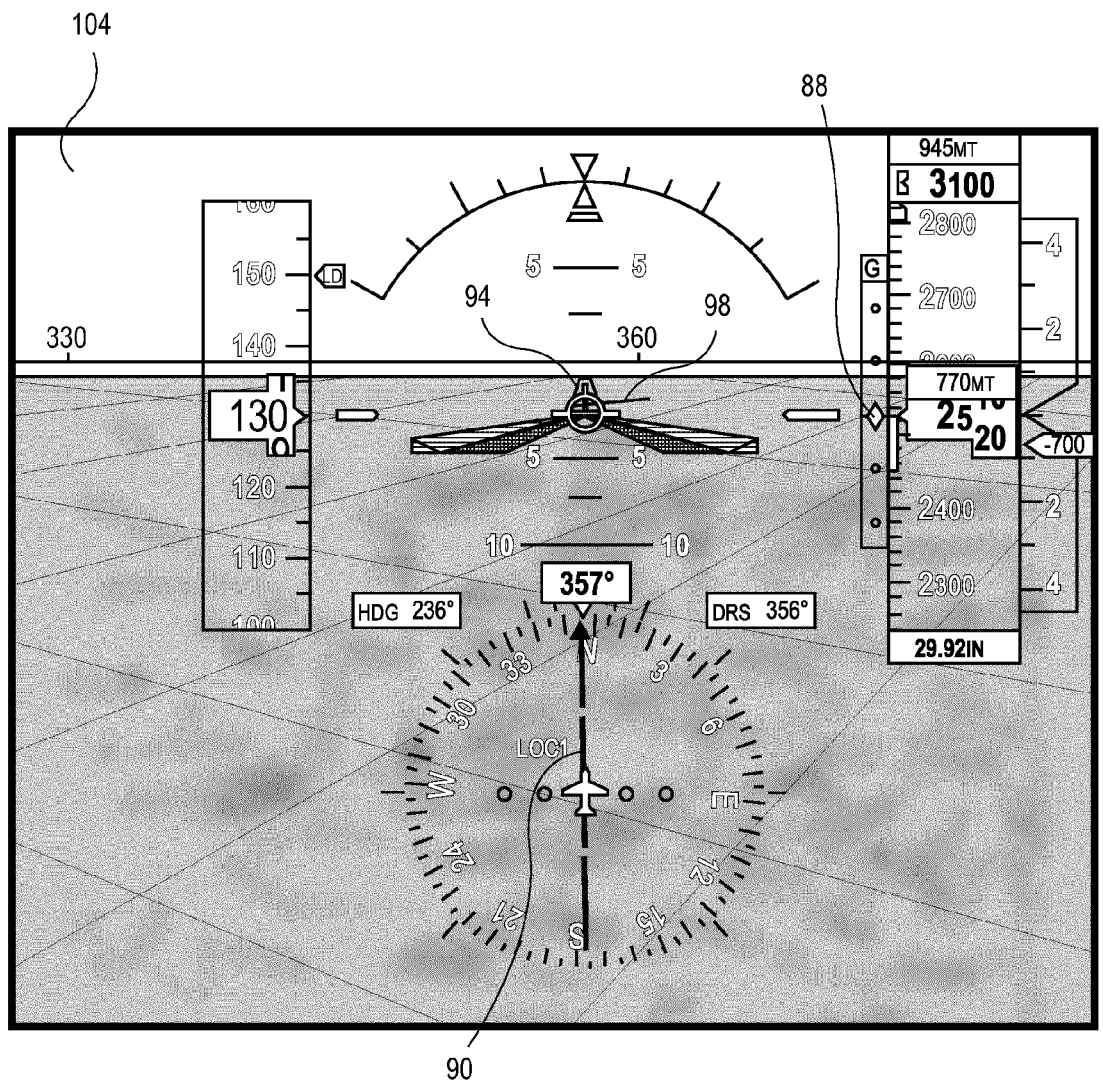
Figure 21:
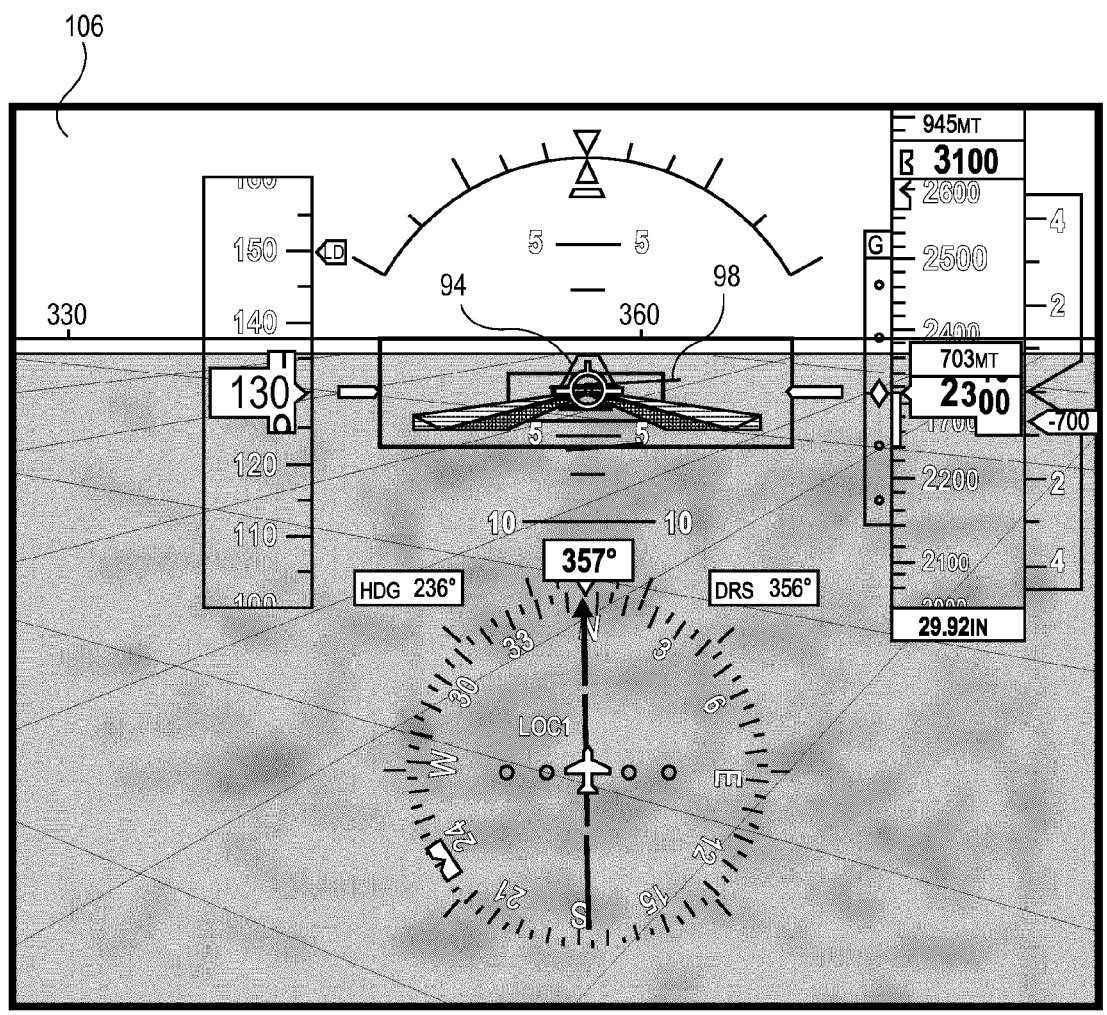
Figure 22:
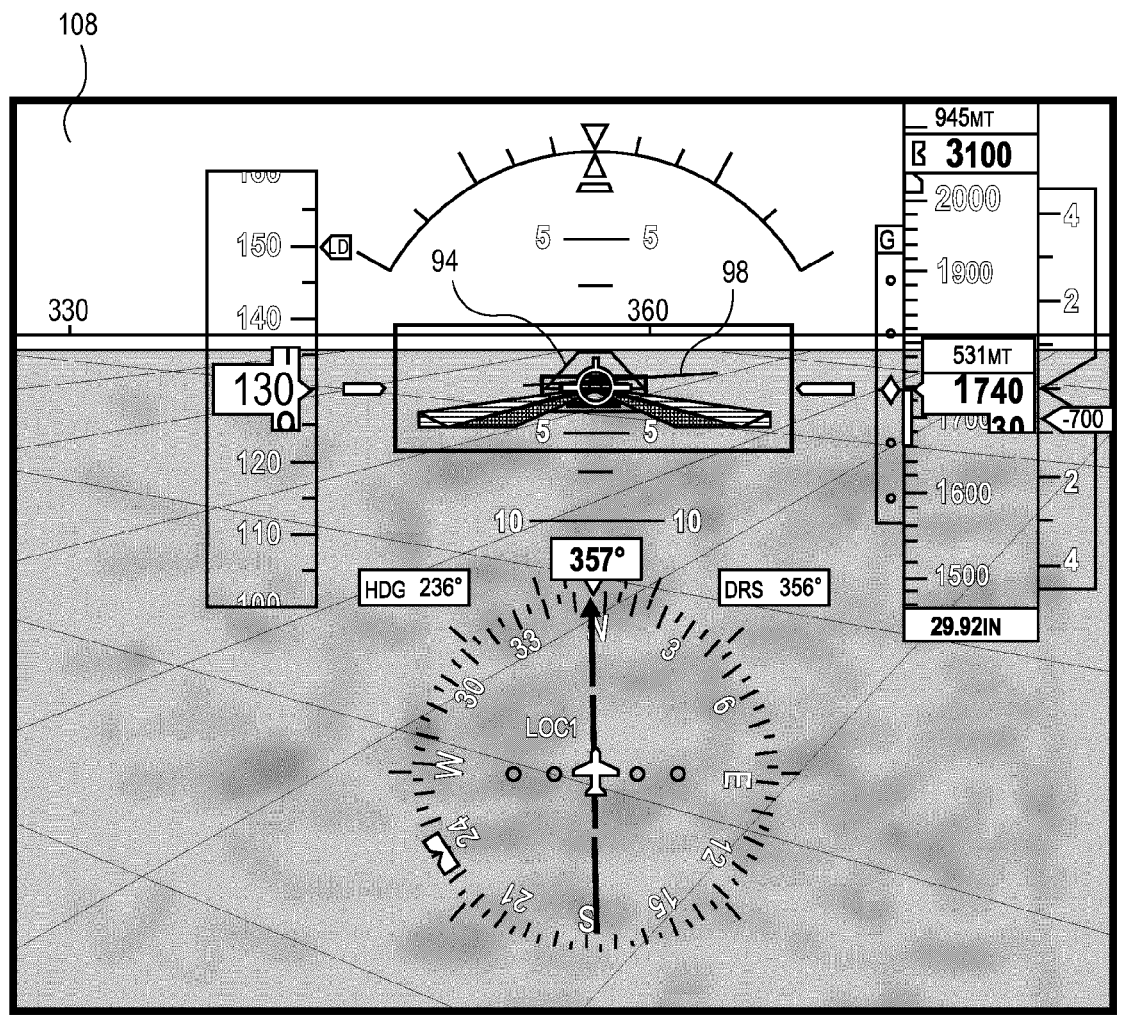
Figure 23:
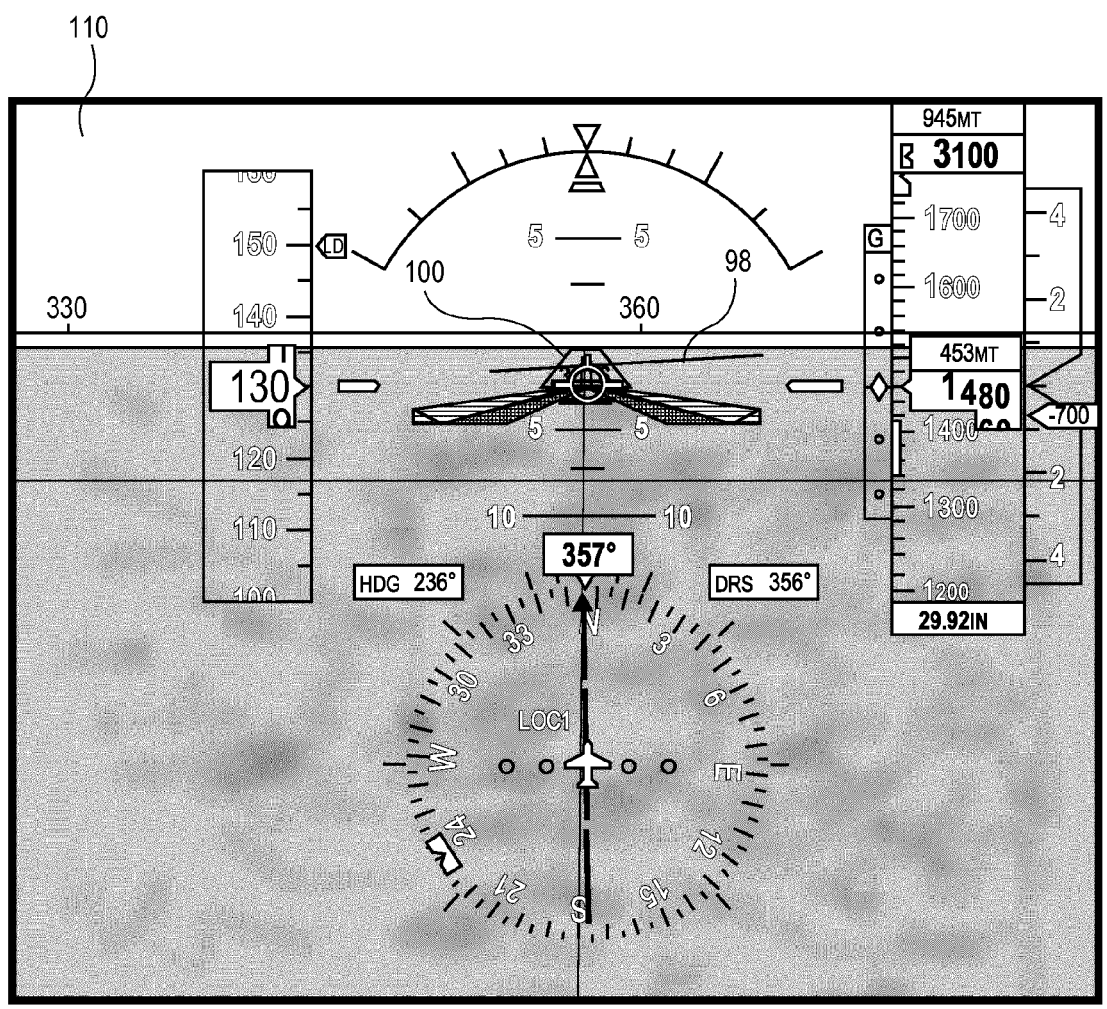
Figure 24:
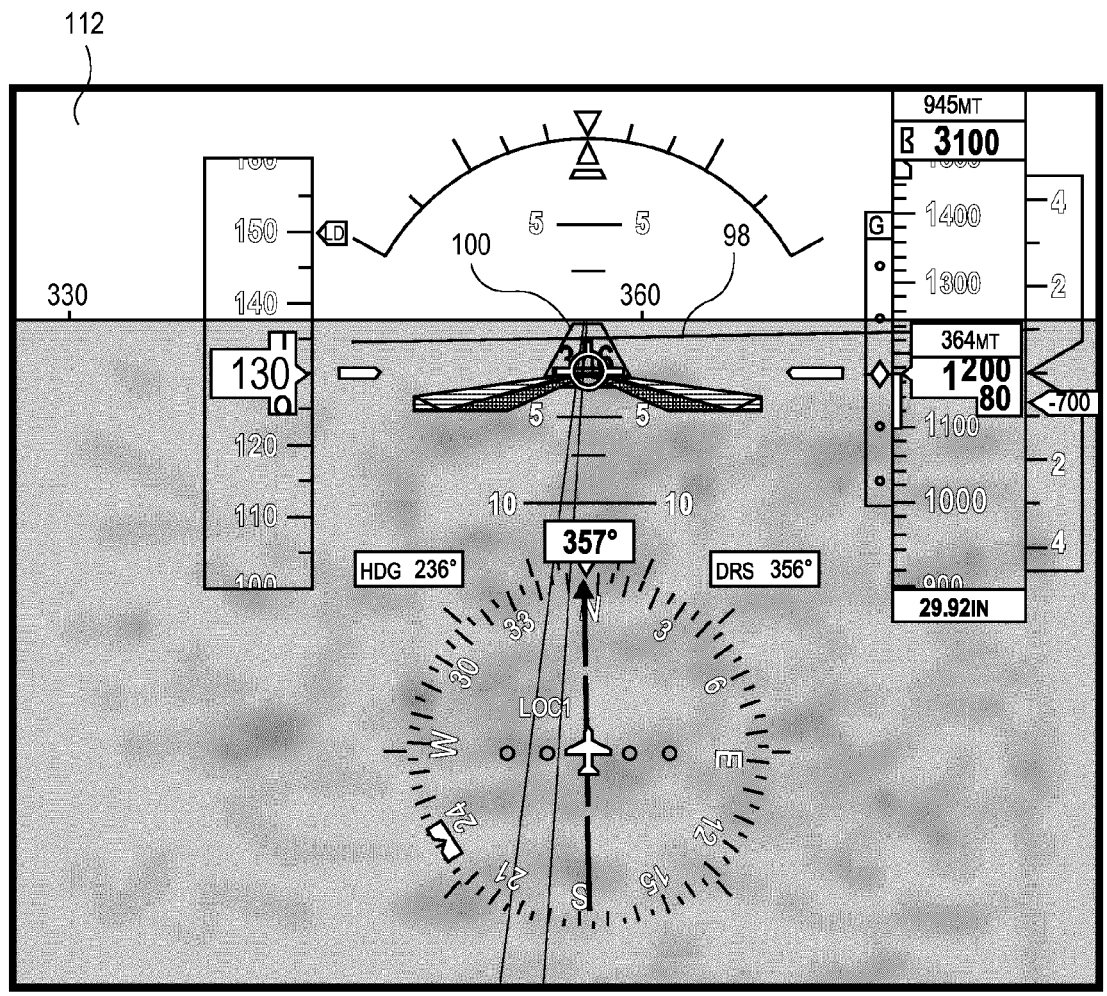
Figure 25:
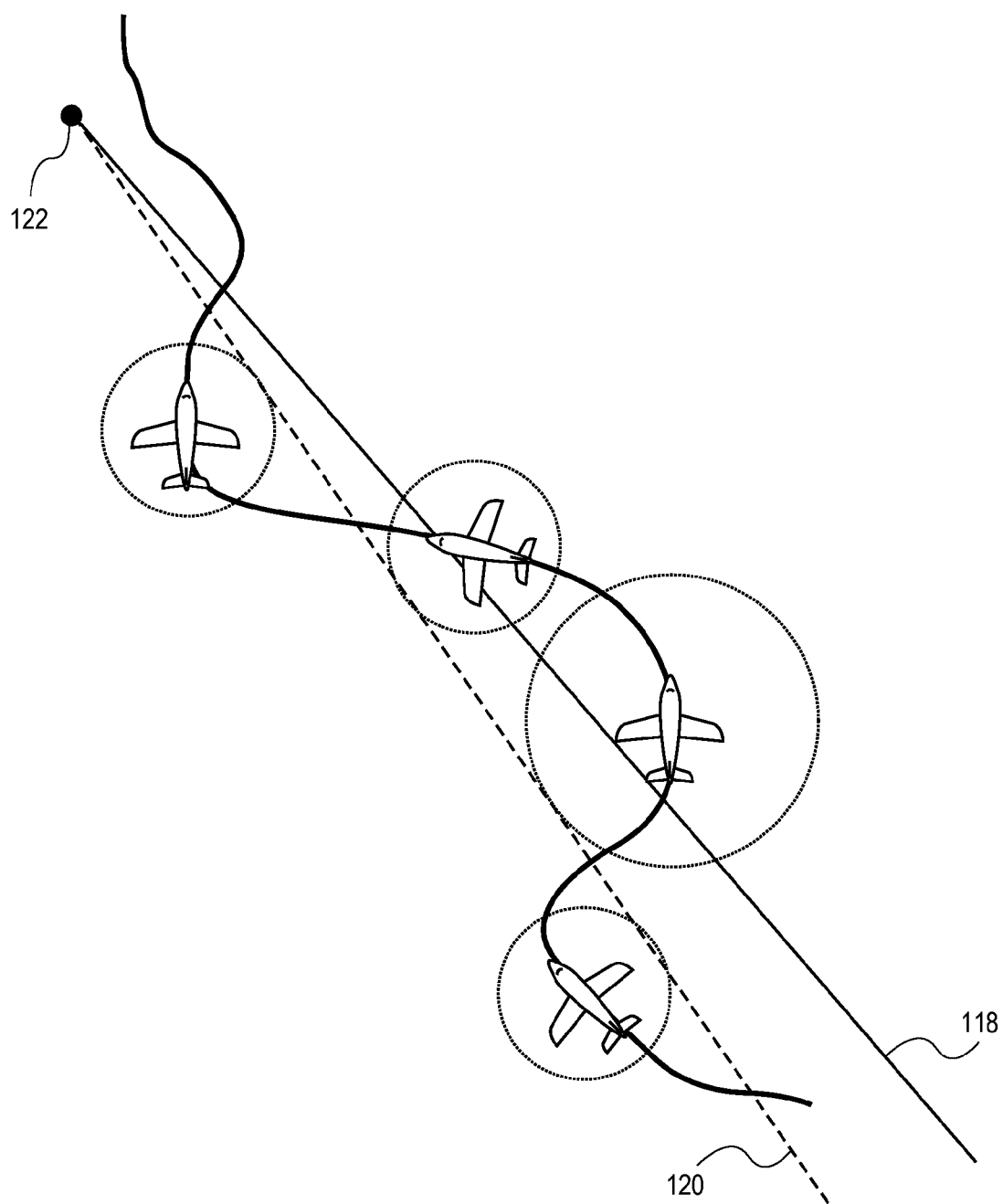
Figure 26:
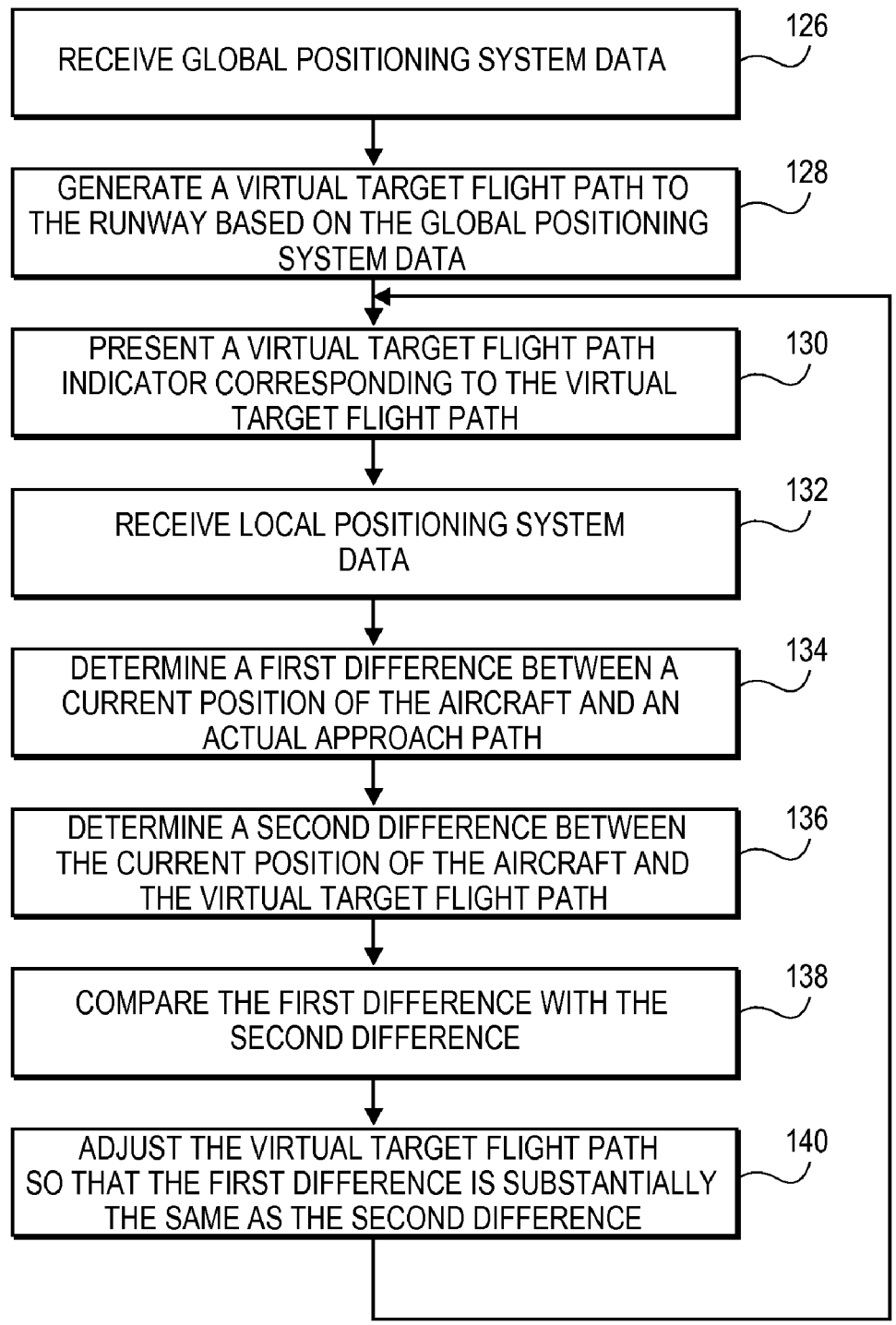
Figure 27:
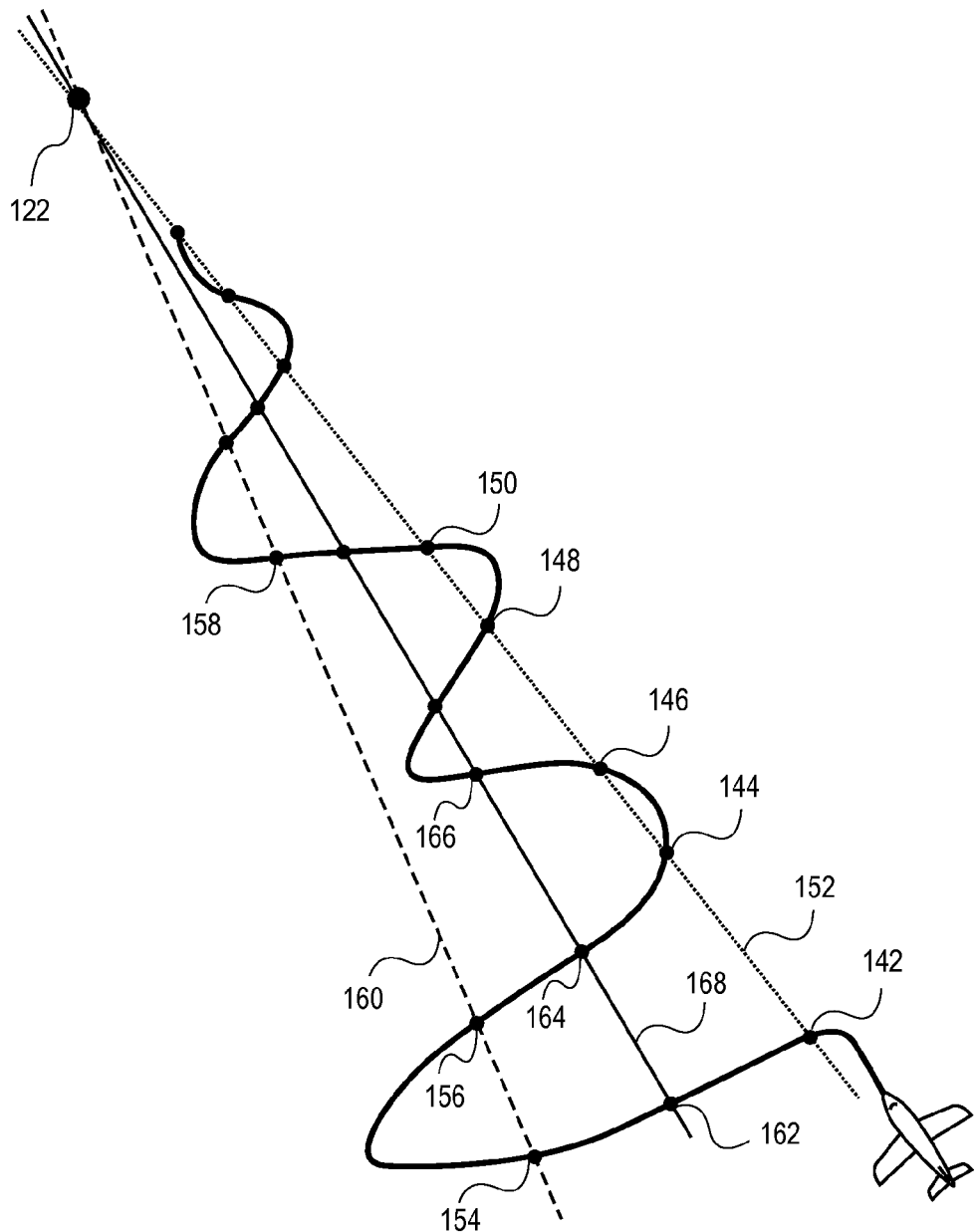
Figure 28:
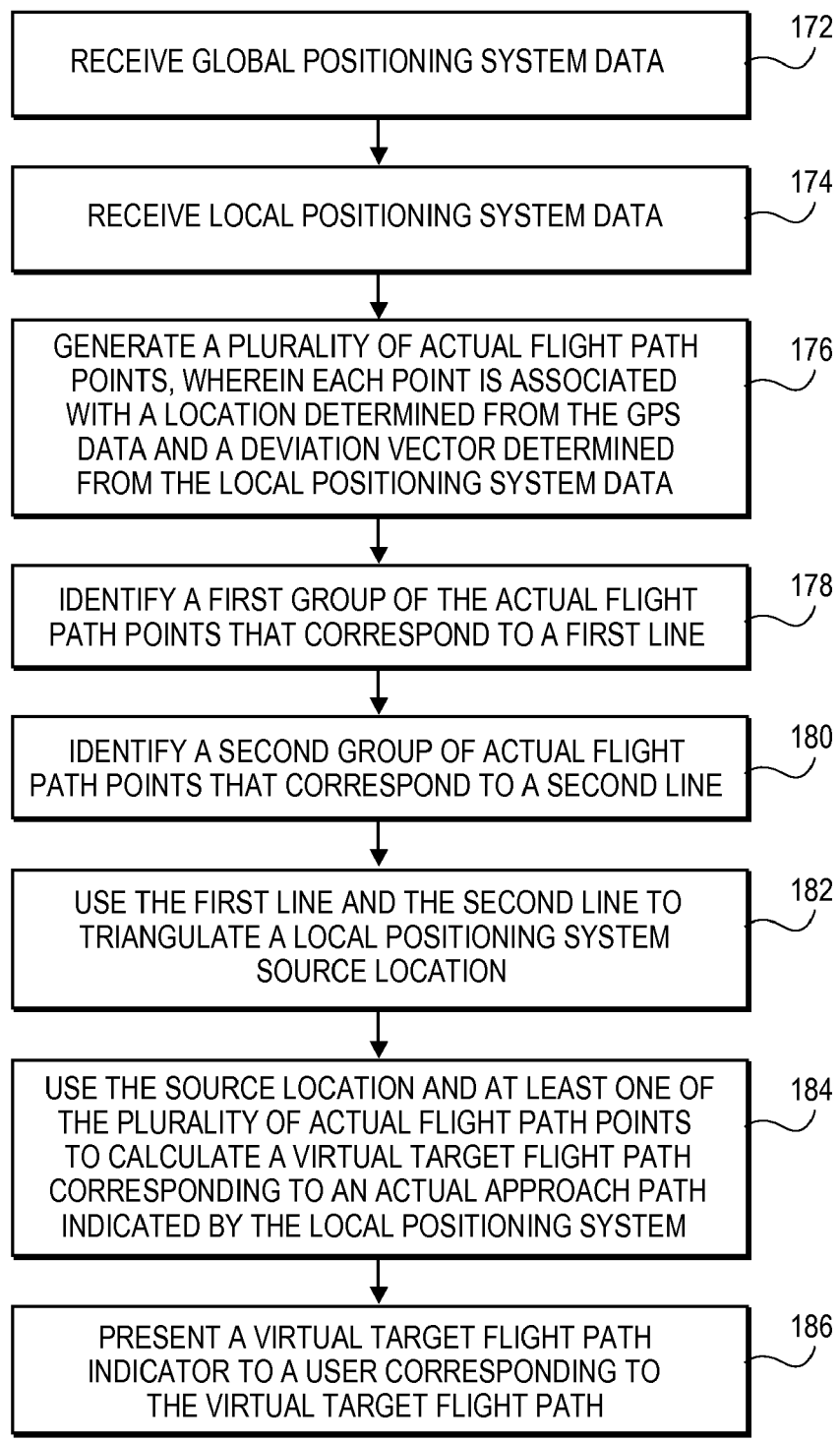
Figure 29:
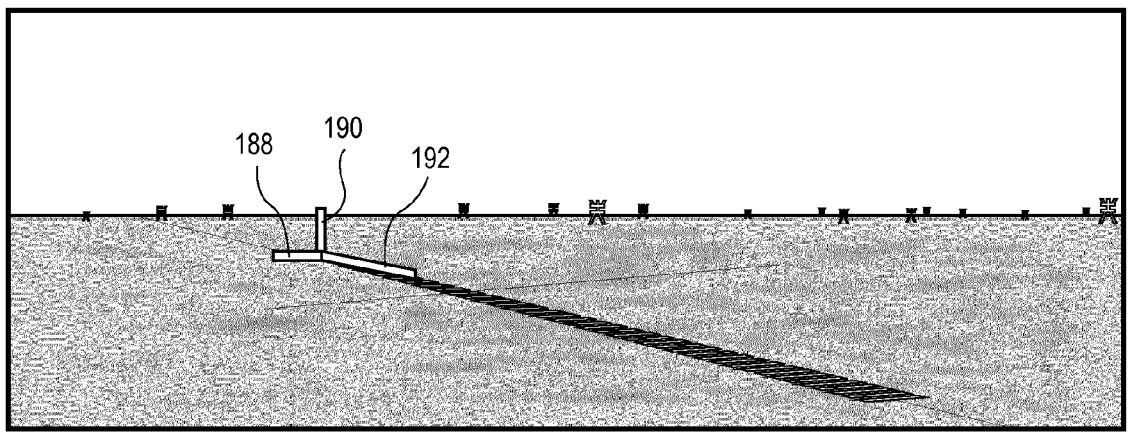
Figure 30:
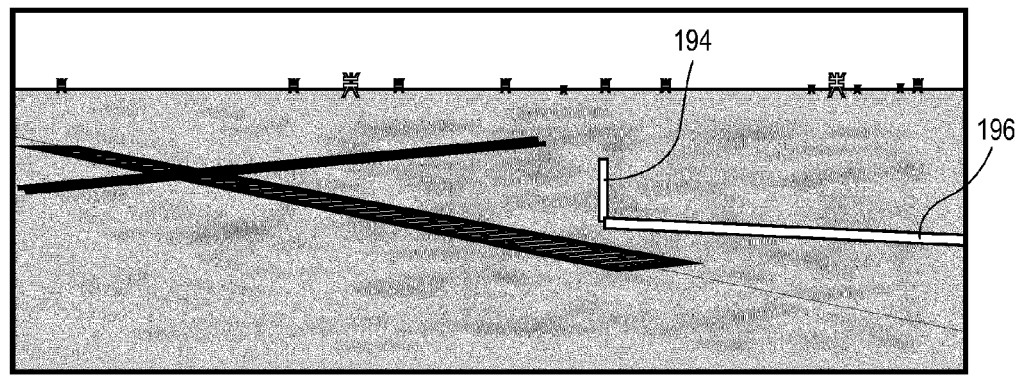
Figure 31:
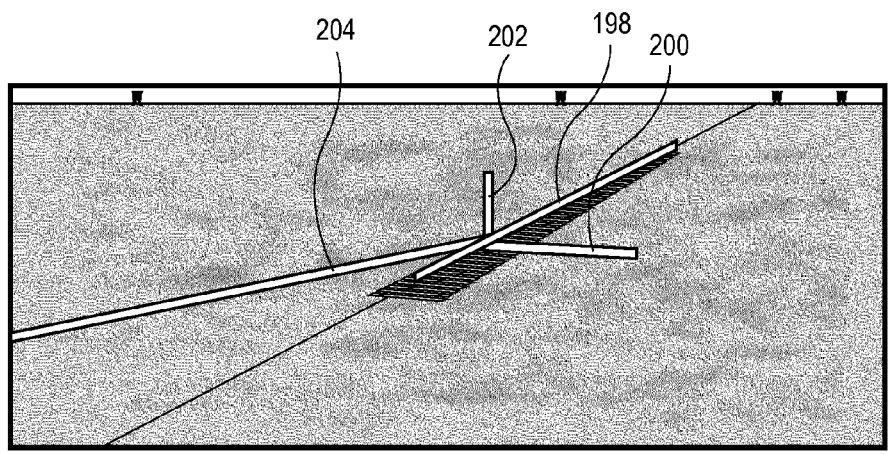

FIG. 12 is another image generated by the system of FIG. 1 depicting a virtual representation of the view from the cockpit of the aircraft and providing the virtual target flight path based on GPS data and the desired flight path, wherein the actual altitude of the aircraft has decreased to 3,320 feet and the virtual target flight path indicates that the target flight path is to the left of the current position of the aircraft;

FIG. 13 is another image generated by the system of FIG. 1 depicting a virtual representation of the view from the cockpit of the aircraft and providing the virtual target flight path based on GPS data and the desired flight path, wherein the actual altitude of the aircraft has decreased to 3,100 feet and the virtual target flight path indicates that the target flight path is to the right of the current position of the aircraft;

FIG. 14 is another image generated by the system of FIG. 1 depicting a virtual representation of the view from the cockpit of the aircraft and providing a virtual target flight path based on GPS data and local positioning system data, wherein the actual altitude of the aircraft has decreased to 3,100 feet and the virtual target flight path indicates that the target flight path located to the right of the current position of the aircraft and extending to the left of a current direction of travel of the aircraft;

FIG. 15 is another image generated by the system of FIG. 1 depicting a virtual representation of the view from the cockpit of the aircraft and providing the virtual target flight path based on GPS data and local positioning system data, wherein the virtual target flight path indicates that the target flight path is to the left of the current position of the aircraft;

FIG. 16 is another image generated by the system of FIG. 1 depicting a virtual representation of the view from the cockpit of the aircraft and providing the virtual target flight path based on GPS data and local positioning system data, and depicting a virtual runway including a depiction of the actual runway an enlarged representation of the actual runway;

FIG. 17 illustrates the virtual runway of FIG. 16 without identification numbers;

FIG. 18 illustrates the virtual runway of FIG. 16 with identification numbers presented to appear normal to a line-of-sight of the user to facilitate identification of the runway;

FIG. 19 is another image generated by the system of FIG. 1 depicting a virtual representation of the view from the cockpit of the aircraft and providing the virtual target flight path based on GPS data and local positioning system data, and depicting the virtual runway;

FIG. 20 is another image generated by the system of FIG. 1 depicting a virtual representation of the view from the cockpit of the aircraft and without the virtual target flight path but depicting the virtual runway;

FIG. 21 is another image generated by the system of FIG. 1 depicting a virtual representation of the view from the cockpit of the aircraft and providing the virtual target flight path based on GPS data and local positioning system data, and depicting the virtual runway;

FIG. 22 is another image generated by the system of FIG. 1 depicting a virtual representation of the view from the cockpit of the aircraft and providing the virtual target flight path based on GPS data and local positioning system data, and depicting the virtual runway;

FIG. 23 is another image generated by the system of FIG. 1 depicting a virtual representation of the view from the cockpit including a depiction of the actual runway;

FIG. 24 is another image generated by the system of FIG. 1 depicting a virtual representation of the view from the cockpit including a depiction of the actual runway;

FIG. 25 is a diagram illustrating certain steps of a first method of using local positioning system data to determine a virtual target flight path to a runway;

FIG. 26 is a flow diagram depicting certain steps performed in the first method of using local positioning system data to determine a virtual target flight path to a runway;

FIG. 27 is a diagram illustrating certain steps of a second method of using local positioning system data to determine a virtual target flight path to a runway;

FIG. 28 is a flow diagram depicting certain steps performed in the second method of using local positioning system data to determine a virtual target flight path to a runway;

FIG. 29 illustrates a first vector representing a localizer plane, as well as second and third vectors contained within the localizer plane;

FIG. 30 illustrates a first vector representing a glideslope plane, as well as a second vector contained within the glideslope plane; and FIG. 31 illustrates a first line representing the localizer plane, a second line representing the glideslope plane, a third line representing a local tangent plane, and a fourth line representing the anticipated final approach path.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A system embodying principles of the present invention is illustrated in FIG. 1 and designated generally by the reference numeral 10. The system 10 comprises a processing system 12, a global positioning component 14, a local positioning component 16, a database 18, and a user interface 20.

The processing system 12 is operable to interact with the other elements of the system 10. The processing system 12 may include any number of processors, controllers, or other processing systems and resident or external memory for storing data and other information accessed and/or generated by the system 10. In accordance with one aspect of the invention, the processing system 12 implements one or more computer programs which solve various algorithms and equations and control the display of information on the user interface 20, as described herein. The one or more computer programs preferably comprise ordered listings of executable instructions for implementing logical functions in the processing system. The one or more computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

As used herein, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The global positioning component 14 may include a global positioning system (GPS) receiver or any other device which can determine locations of an aircraft in which the device 10 is used. The location determining component may be, for example, a GPS receiver much like those provided in products by GARMIN INTERNATIONAL, INC. of Olathe, Kans. and disclosed in U.S. Pat. No. 6,434,485, which is incorporated herein by specific reference in its entirety.

Figure 2:
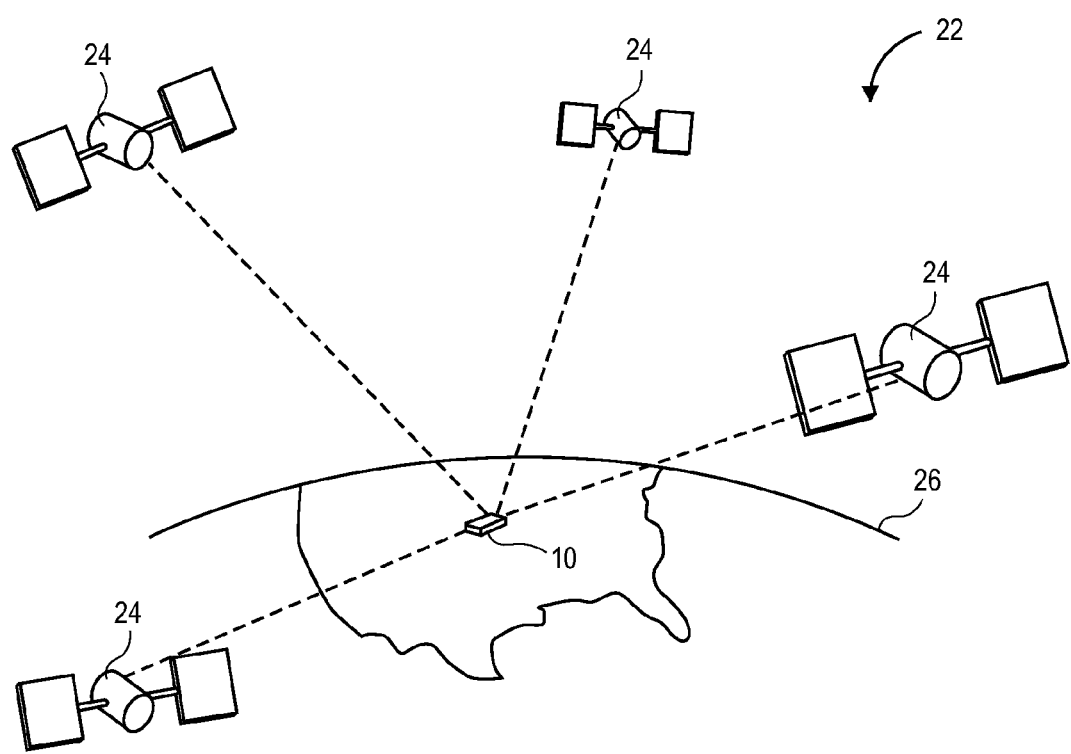
FIG. 2 is a diagram of a Global Positioning System (GPS) that may be utilized by various embodiments of the present invention.

In general, the GPS is a satellite-based radio navigation system capable of determining continuous position, velocity, time, and direction information for an unlimited number of users. As illustrated in FIG. 2, a plurality of satellites 24 are in orbit about the Earth 26. The orbit of each satellite is not necessarily synchronous with the orbits of other satellites and, in fact, is likely asynchronous. A GPS receiver system 10 such as the ones described in connection with preferred embodiments of the present invention is shown receiving spread spectrum GPS satellite signals from the various satellites 24.

The spread spectrum signals continuously transmitted from each satellite 24 utilize a highly accurate frequency standard accomplished with an extremely accurate atomic clock. Each satellite 24, as part of its data signal transmission, transmits a data stream indicative of that particular satellite. The system 10 can acquire spread spectrum GPS satellite signals from at least three satellites for the GPS receiver device to calculate its two-dimensional position by triangulation.

The global positioning component 14 is operable to receive navigational signals from the GPS satellites 24 to calculate a position of the system 10 as a function of the signals. The global positioning component 14, the processing system 12, or both may also be operable to calculate a route to a desired location, provide instructions to navigate to the desired location, display maps and other information via the user interface 20, and to execute other functions described herein.

The global positioning component 14 may include one or more processors, controllers, or other processing systems and memory or may utilize the components of the processing system 12. The memory of the processing system 12 and/or the global positioning component 14 may store cartographic data and routing used by or generated by the global positioning component 14. The memory may be integral with the global positioning component 14, integral with the processing system 12 stand-alone memory, or a combination of both. The memory may include, for example, removable flash cards.

The global positioning component 14 may include an internal or external antenna to assist the global positioning component 14 in receiving signals. The antenna may be a removable quad-helix antenna or any other type of antenna that can be used with navigational devices. The antenna may be mounted directly on or in the housing or may be mounted external to the housing.

The local positioning component 16 may be compatible with an instrument landing system (ILS). The ILS is a ground-based instrument approach system which provides precise guidance to an aircraft approaching a runway, using a combination of radio signals and, in many cases, high-intensity lighting arrays, to enable a safe landing under any conditions, including in reduced-visibility situations.

Figure 3:
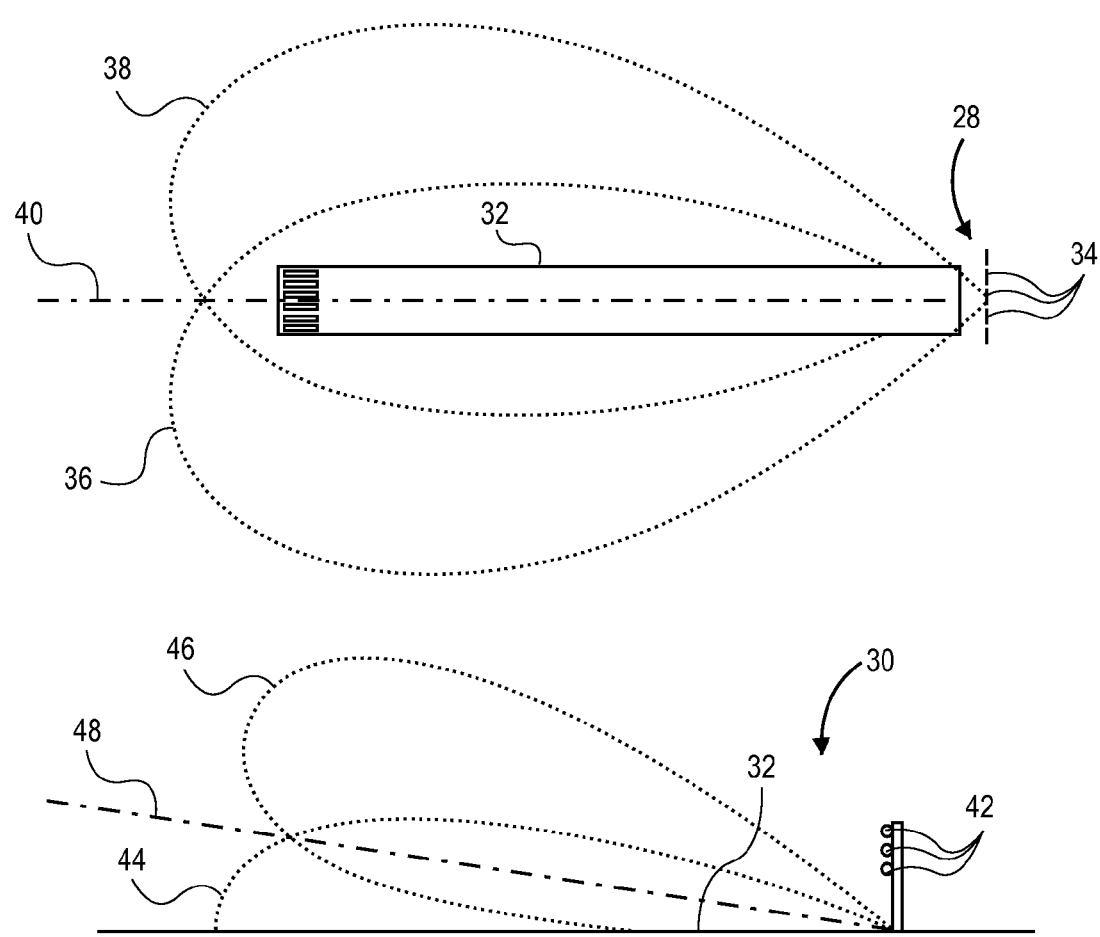
FIG. 3 is a diagram of an instrument landing system (ILS) that may be utilized by various embodiments of the present invention.

Referring also to FIG. 3, an exemplary ILS may consist of two ground-based subsystems 28,30 and an aircraft receiver, such as the local positioning component 16 of the system 10. A first ground-based subsystem 28 provides lateral guidance to aircraft approaching a runway 32, and a second ground-based subsystem 30 provides vertical guidance to aircraft approaching the runway 32. The first ground-based subsystem 28, referred to as a "localizer," may include several pairs of directional antennas 34 placed proximate an end of the runway 32. The directional antennas 34 generate two directional signal beams 36,38, a first directional signal beam 36 slightly to the left of the center 40 of the runway 32 and a second directional signal beam 38 slightly to the right of the center 40 of the runway 32.

The first signal beam 36 is modulated at a first frequency, such as 150 Hz, and the second signal beam 38 is modulated at a second frequency, such as 90 Hz, enabling the aircraft ILS receiver to automatically determine its position relative to a center of the runway based on the ILS signals received. The system 10 recognizes if there is a predominance of either the first type of modulation or the second type of modulation, for example, and may provide an indicator to a pilot that the aircraft is not aligned with the center 40 of the runway 32.

The second ground-based subsystem 30 includes a glideslope antenna array 42 transmitting a pair of signals 44,46 similar to those of the localizer, except that the signals 44,46 are arranged to define a glideslope 48 or "vertical centerline" of a pre-determined angle, such as three degrees above horizontal.

As an aircraft equipped to utilize the ILS approaches the runway 32, a flight display in the cockpit of the aircraft presents indicators of the aircraft's position relative to the lateral centerline 40 and the glideslope 48. A first indicator, such as the indicator 88 of FIGS. 14 and 15, may indicate a current deviation from the glideslope 48, and a second indicator, such as the indicator 90 of FIGS. 14 and 15, may indicate a current deviation from the lateral centerline 40. The pilot can maintain the aircraft in alignment with the runway 32 by positioning each indicator 88,90 at a desired position. Unfortunately, the dual-indicator system can be undesirable to work with. As explained above in the section titled "BACKGROUND OF THE INVENTION," for example, the dual-indicator system only indicates to the pilot how far from a desired path the current location is, wherein the pilot may overshoot or undershoot the desired path in attempting to make corrections. Furthermore, the pointer display may be difficult to see because, for example, the pilot may be shifting his/her view between the runway 32, the first indicator 88, and the second indicator 90.

Figure 4:
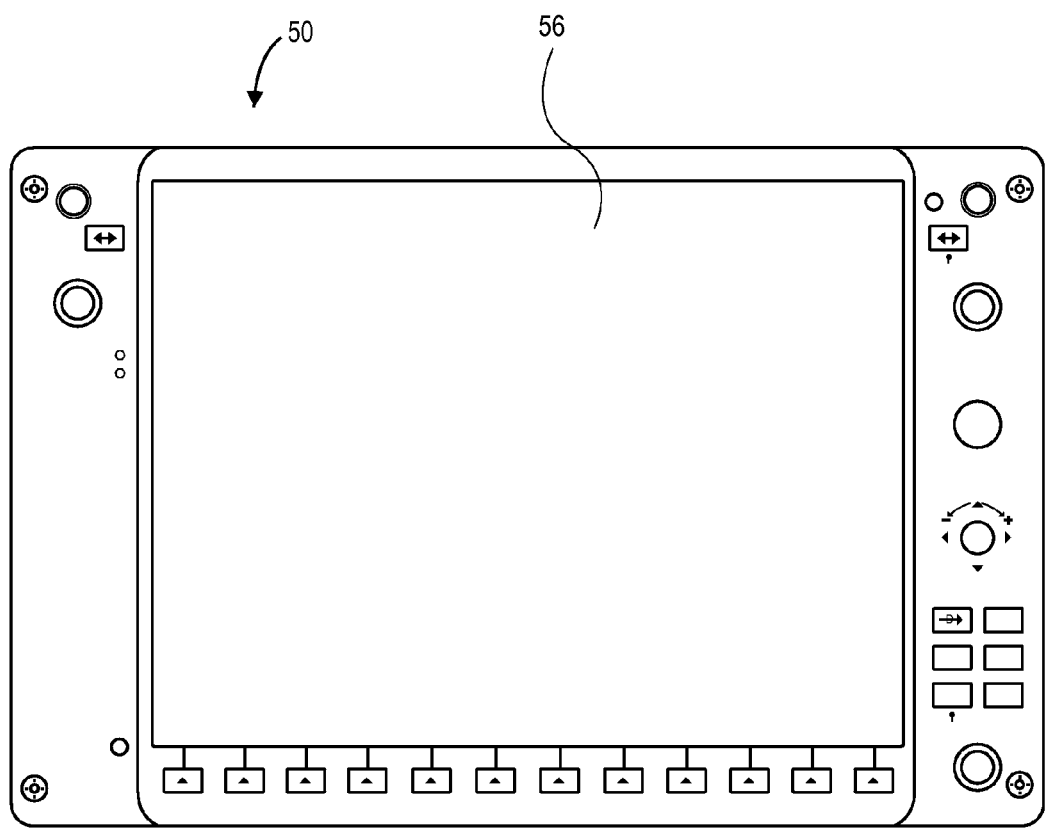
FIG. 4 is a front elevation view of an exemplary display that may be used as part of the user interface of the system of FIG. 1.
Figure 5:
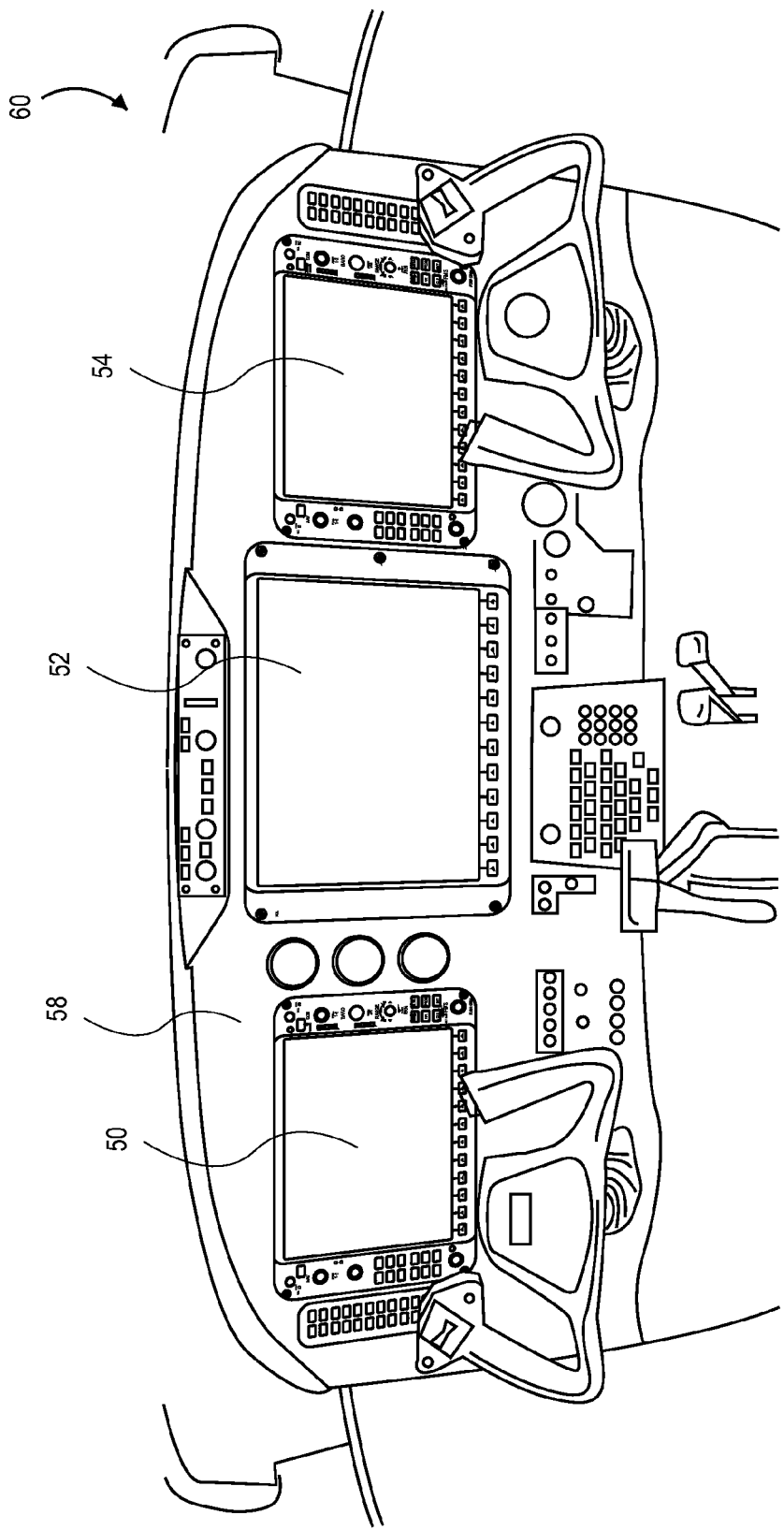
FIG. 5 is a perspective view of an exemplary aircraft flight deck incorporating the system of FIG. 1, including the display of FIG. 4.

The user interface 20 enables users to interact with the system 10. An exemplary user interface 20 may include one or more interactive displays 50,52,54 illustrated in FIGS. 4 and 5. The display 50 includes a display screen 56 and a plurality of knobs, buttons, or similar user interface elements operable to allow the user to interact with, and submit information to, the system 10. The display screen 56 may include touch-screen technology in addition to or in place of the knobs, buttons, or similar user interface elements. The display 50 may be a stand-alone unit containing the entire system 10, designed for ease of transport between aircraft, or may be integrated into a flight deck 58 of an aircraft 60, as illustrated in FIG. 5. The user interface 20 may include multiple displays, such as a first primary flight display 50, a multi function display 52, and a second primary flight display 54. The displays 50,52,54 may present primary flight, navigation, weather, terrain, traffic, radio frequency and engine data to the user. The system 10 may be part of, for example, the model G1000 avionics suite provided by GARMIN INTERNATIONAL, INC. of Olathe, Kans.

The database 18 is a collection of data organized and stored to facilitate access by one or more computer processors, such as one or more processors associated with the processing system 12. The database 18 may contain navigational data including, but not limited to, cartographic data including geographic features of the Earth 26, and airport information including designated final approach paths.

The system 10 is operable to enhance a pilot's situation awareness by presenting a virtual target flight path to the pilot during landing approaches using both a global positioning system and a local positioning system, such as the GPS system and the ILS system described above. FIGS. 6-16 and 19-24 illustrate an exemplary sequence of images presented by one or more of the displays 50,52,54 that assist a user in navigating the aircraft to a destination and landing an aircraft during a final approach to a runway. The images present a virtual representation of geographic features in the vicinity of the aircraft such that the user would recognize, for example, the sky, the ground, and features on the ground such as roads, towers, mountains, and bodies of water.

Figure 6:
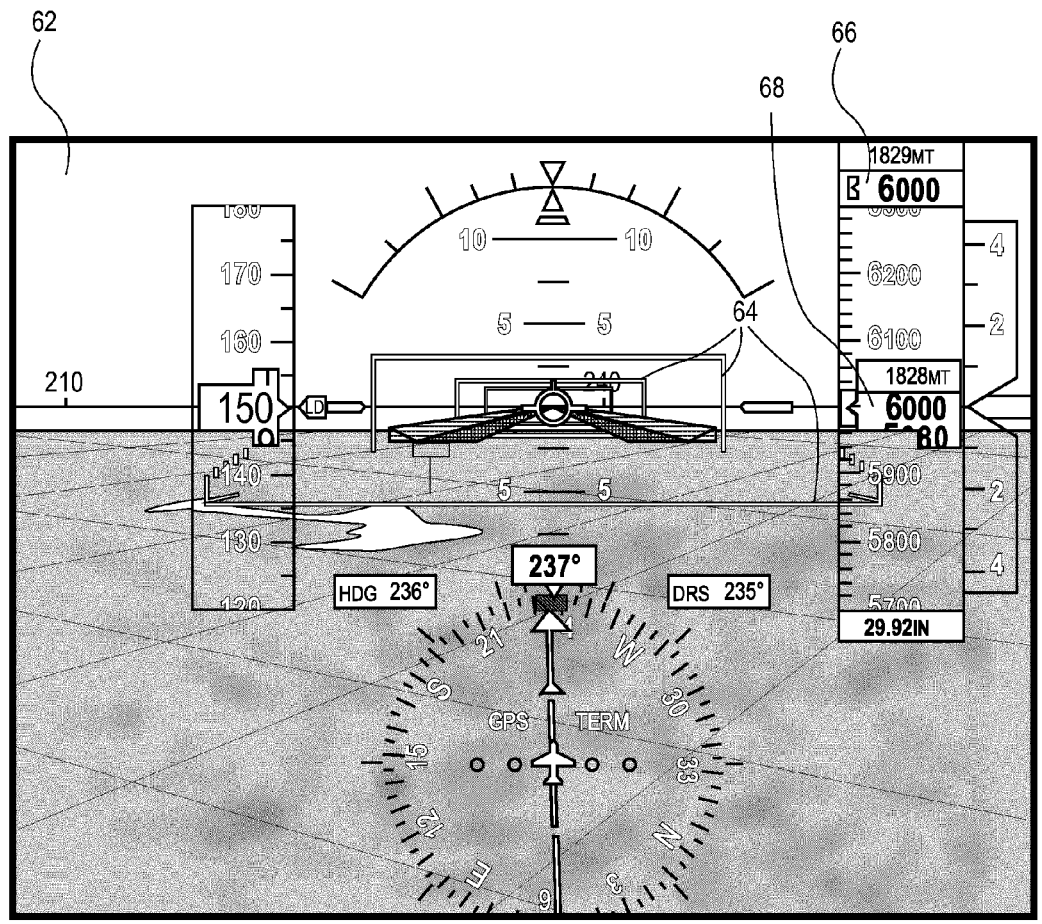
FIG. 6 is a first image generated by the system of FIG. 1 depicting a virtual representation of a view from the cockpit of an aircraft and providing a virtual target flight path based on GPS data and a desired flight path, wherein the virtual target flight path substantially corresponds to a current position of the aircraft.
Figure 7:
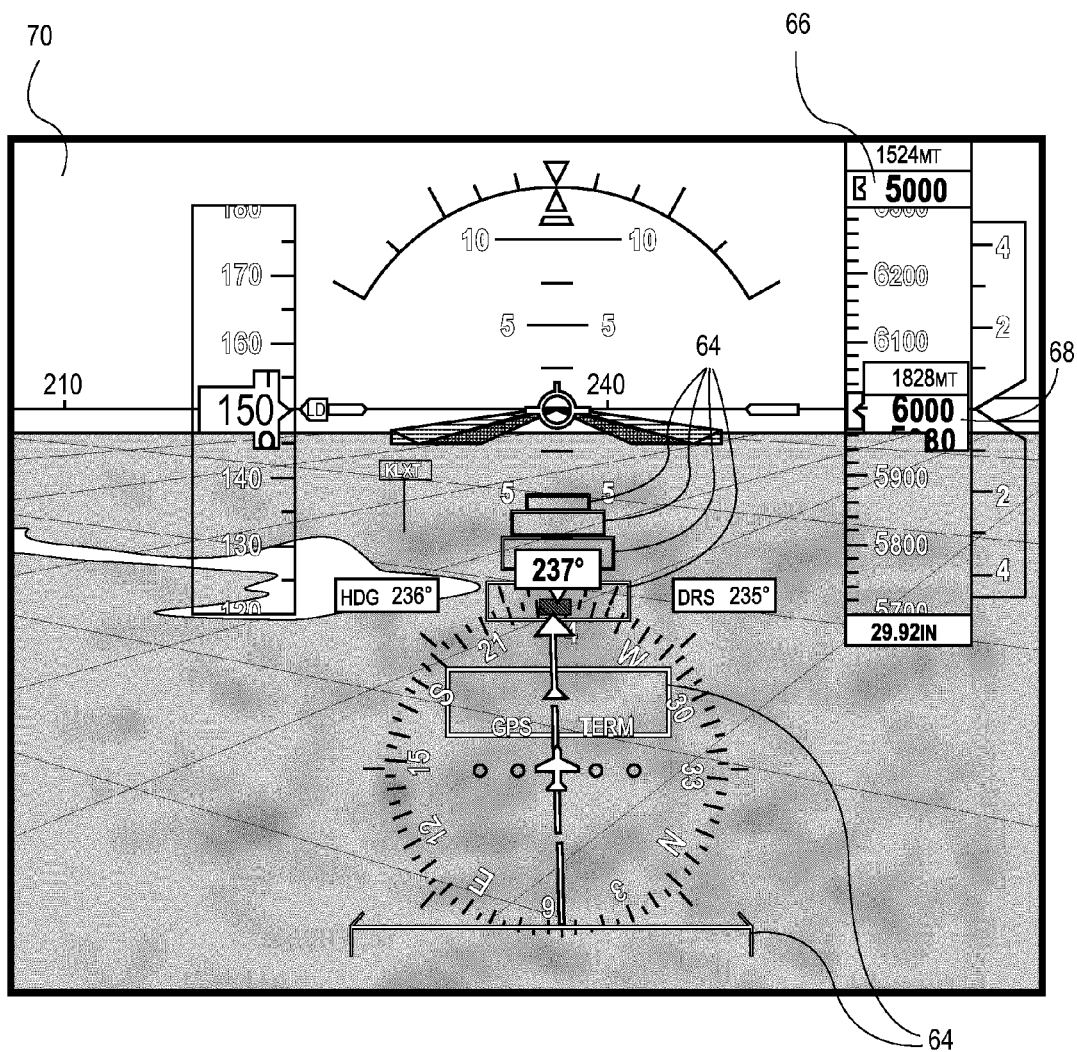
FIG. 7 is another image generated by the system of FIG. 1 depicting a virtual representation of the view from the cockpit of the aircraft and providing the virtual target flight path based on GPS data and the desired flight path, wherein the virtual target flight path has been adjusted by a user to correspond to an altitude that is lower than a current position of the aircraft.
Figure 8:
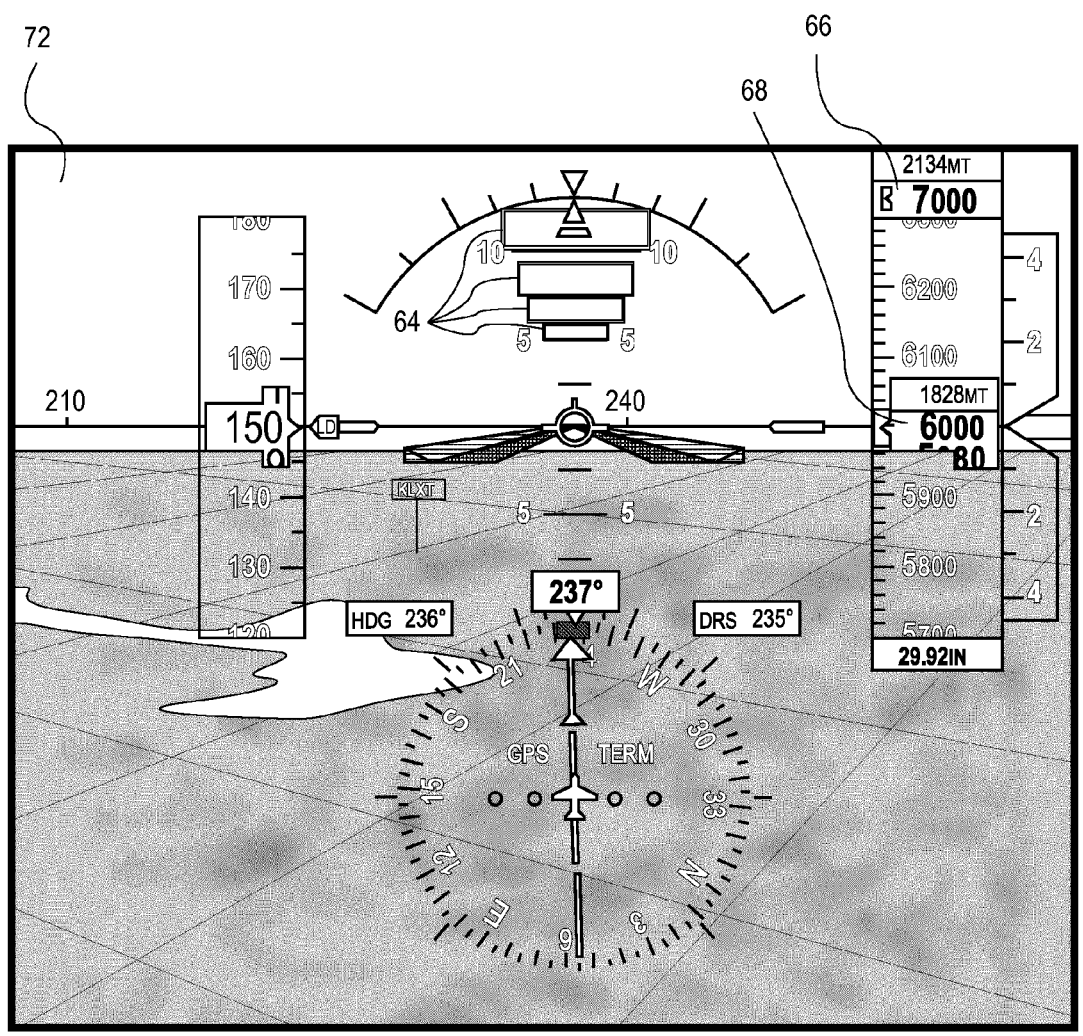
FIG. 8 is another image generated by the system of FIG. 1 depicting a virtual representation of the view from the cockpit of the aircraft and providing the virtual target flight path based on GPS data and the desired flight path, wherein the virtual target flight path has been adjusted by a user to correspond to an altitude that is higher than a current position of the aircraft.

FIGS. 6-8 illustrate a series of images that demonstrate a virtual target flight path generated by the system 10 based on information received from the global positioning system 22 and settings received from the user. In a first image 62 of FIG. 6, the virtual target flight path is indicated by a series of targets 64. The targets 64 generally indicate to the user a location of the desired flight path relative to a current position and/or heading of the aircraft. By flying the aircraft toward the targets 64, the pilot is able to follow an actual flight path that is close to or the same as the virtual target flight path.

The illustrated targets 64 are rectangular outlines, wherein the pilot attempts to fly the airplane "through" the outlines. It will be appreciated that the targets 64 need not be rectangular outlines, as illustrated in the drawings, but may take virtually any form that effectively indicates a position of the virtual target flight path. By way of example, the targets 64 may be outlines of another shape, such as circles or ovals, or may not be outlines at all but may be arrows, cross-hairs, and so forth.

In image 62, a current altitude indicator 68 indicates that the current altitude of the aircraft is 6,000 feet, and a target altitude indicator 66 indicates that a target altitude has been set to 6,000 feet. Because the current altitude and the target altitude are the same, the targets 64 are presented in a substantially linear array to the front of, and in line with, a current position of the aircraft. The system 10 enables the user to adjust the target altitude of the virtual target flight path, by, for example, actuating a knob or button of the one of the displays 50,52,54.

In image 70 of FIG. 7, for example, the target altitude of the virtual target flight path has been adjusted downwardly to 5,000 feet, as indicated by the target altitude indicator 66. The current altitude is 6,000 feet, as indicated by the current altitude indicator 68. Thus, the targets 64 are presented in the image 70 to appear below the current position of the aircraft, indicating that the current altitude of the aircraft is greater than the target altitude of 5,000 feet, and that by flying downward toward the targets 64 the aircraft will reach the target altitude. When the user adjusts the target altitude, the system 10 automatically determines a new virtual target flight path based on the adjusted target altitude and presents the new virtual target flight path in real time or in substantially real time. As used herein, "real time" means with no or limited perceptible delay to the user. Thus, when the user adjusts the target altitude, the system 10 presents the new virtual target flight path, as indicated by the targets 64, with no or substantially no delay perceived by the user.

Similarly, in image 72 of FIG. 8, the target altitude of the virtual target flight path has been adjusted upwardly to 7,000 feet, as indicated by the target altitude indicator 66. The current altitude is 6,000 feet, as indicated by the current altitude indicator 68. The targets 64 are presented to appear above the current position of the aircraft, indicating that the current altitude of the aircraft is less than the target altitude of 7,000 feet, and that by flying upward toward the targets 64 the aircraft will reach the target altitude.

Each target 64 may represent a fixed position along the virtual target flight path, such that the system 10 moves the targets 64 to reflect changes in the position of the aircraft. As the aircraft moves forward along the virtual target flight path and closer to the position of a target, for example, the system 10 causes the target to appear closer to the aircraft. Furthermore, the system 10 continuously removes the most proximate target and replaces it with a new, most distal target, and the targets may be faded in and faded out. As used herein, "fading in" a target means first presenting the target in a less perceptible form and gradually causing the target to become more perceptible. Similarly, as used herein, "fading out" a target means causing a target to gradually become less perceptible before completely removing the target.

Figure 9:
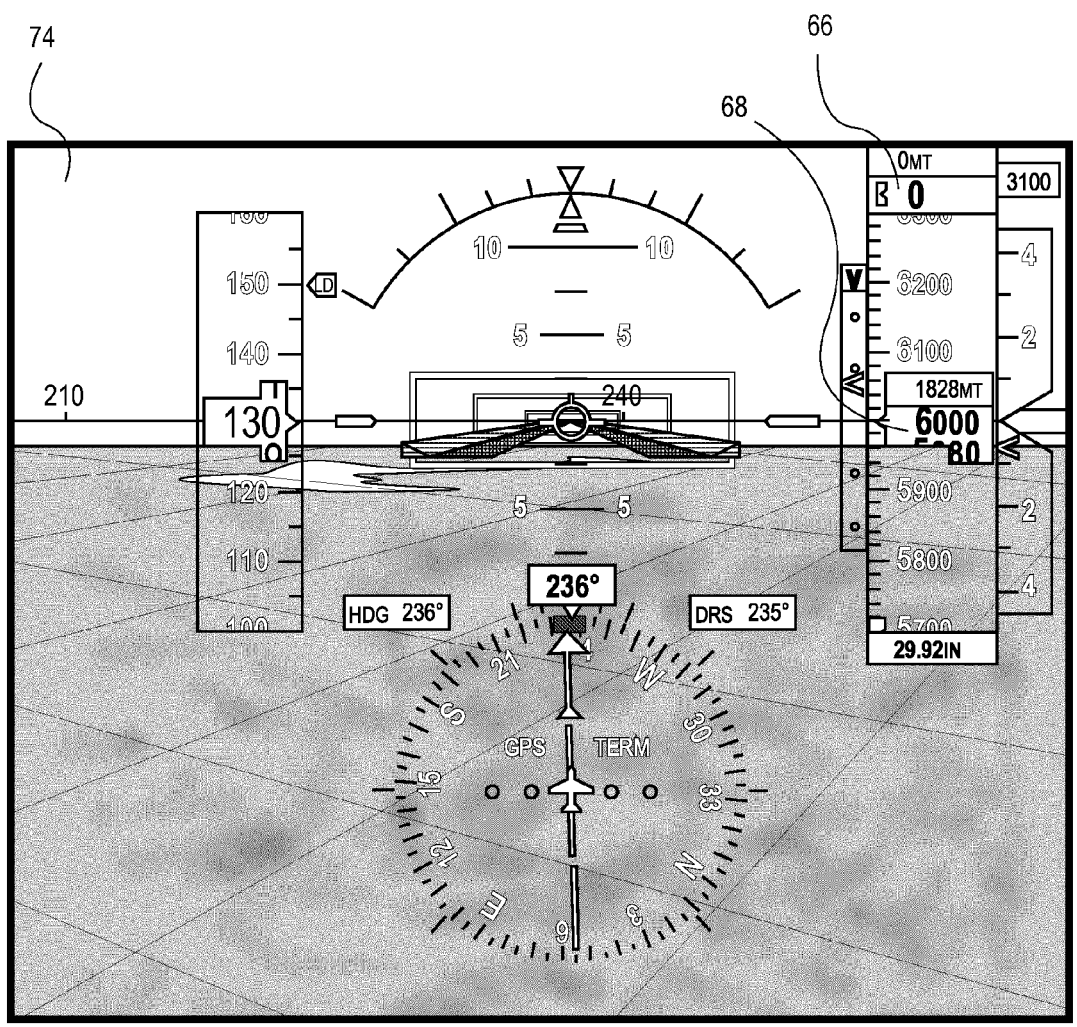
FIG. 9 is another image generated by the system of FIG. 1 depicting a virtual representation of the view from the cockpit of the aircraft and providing the virtual target flight path based on GPS data and the desired flight path, wherein a target altitude of the virtual target flight path has been adjusted to 0 feet by a user.
Figure 10:
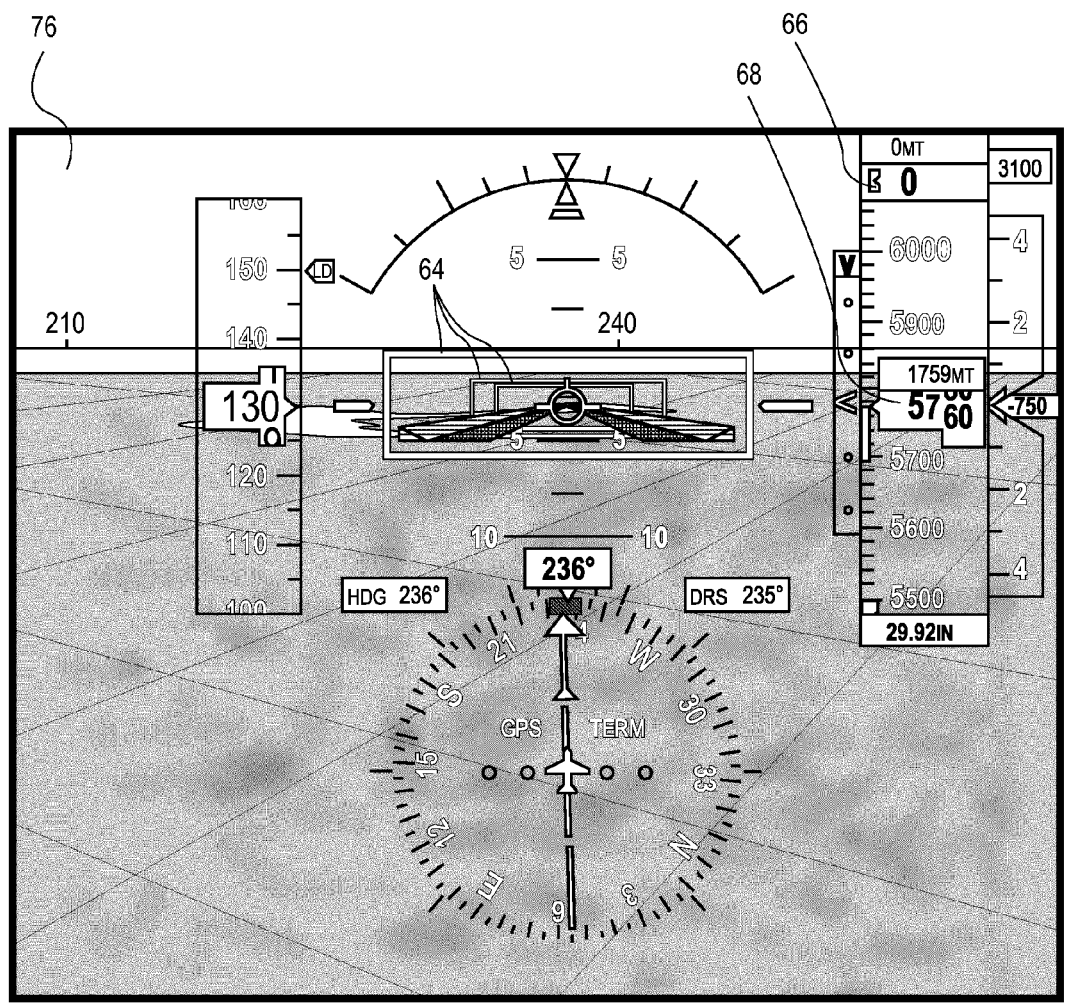
FIG. 10 is another image generated by the system of FIG. 1 depicting a virtual representation of the view from the cockpit of the aircraft and providing the virtual target flight path based on GPS data and the desired flight path, wherein the virtual target flight path has been adjusted according to the decreased target altitude.
Figure 11:
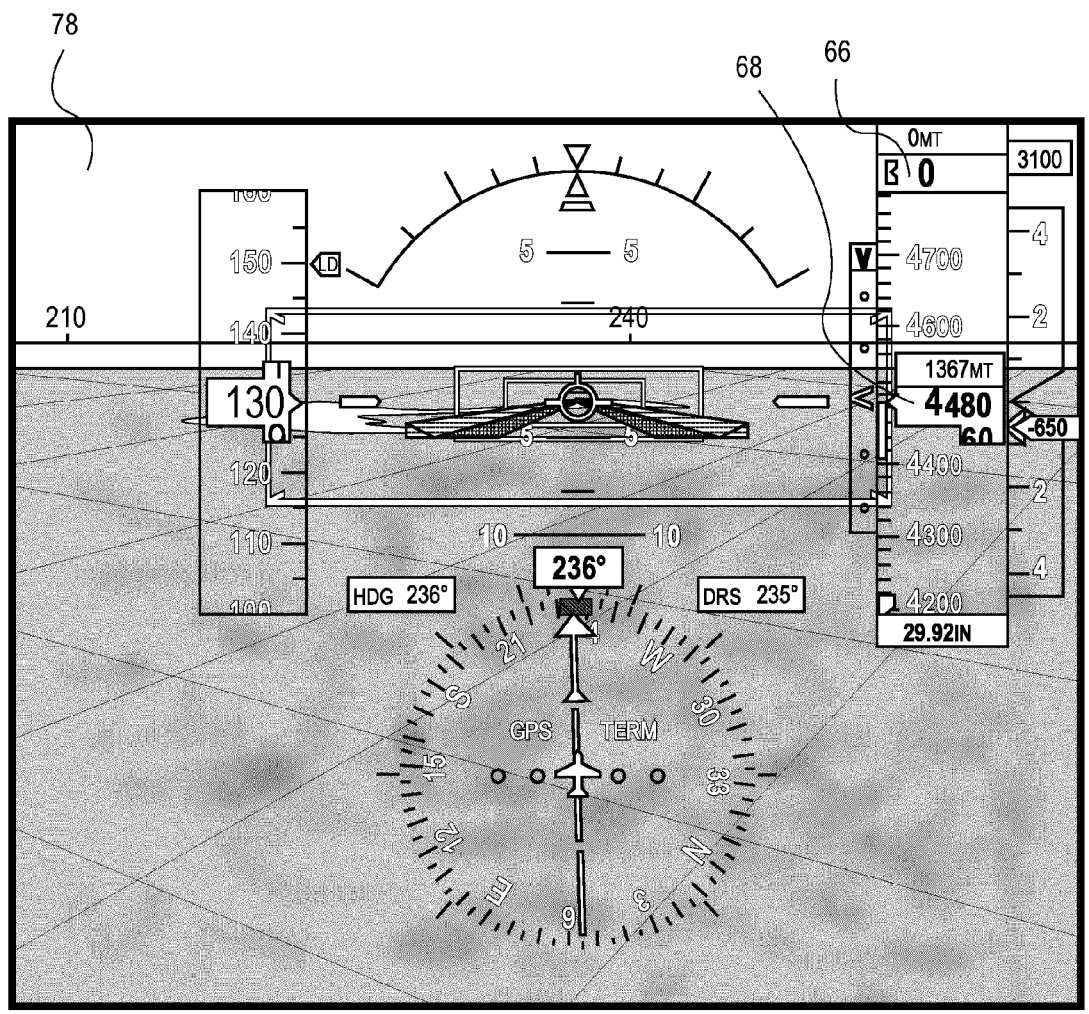
FIG. 11 is another image generated by the system of FIG. 1 depicting a virtual representation of the view from the cockpit of the aircraft and providing the virtual target flight path based on GPS data and the desired flight path, wherein an actual altitude of the aircraft has decreased to 4,480 feet.

In image 74 of FIG. 9, the target altitude indicator 66 has been set by a user to 0 feet, and in image 76 of FIG. 10, the virtual target flight path as indicated by the targets 64, is generally heading downward. The aircraft appears to be in line with the targets 64 in image 76, indicating that the flight of the aircraft has been adjusted downwardly to match the virtual target flight path and that the aircraft is in descent. This is also evidenced by the current altitude indicator 68 which has dropped to 5,760 feet in image 76 from 6,000 feet in image 74. In image 78 of FIG. 11, the current altitude indicator 68 shows that the aircraft has further descended to an altitude of 4,480 feet as it continues to follow the generally downward virtual target flight path.

As explained below, the system 10 may recognize a minimum altitude that is greater than the altitude selected by the user and indicated by the target altitude indicator 66. In FIG. 9, for example, the virtual target flight path indicated by the targets 64 may descend to an altitude of 3,100 feet (or other altitude) corresponding to a minimum altitude, such as a minimum altitude associated with an approach to a runway. Thus, the system 10 selects the greater of the selected altitude and a minimum altitude (if any) associated with the flight path.

In image 80 of FIG. 12, the current altitude indicator 68 shows that the aircraft has descended to an altitude of 3,320 feet, and further indicates that the target flight path is to the left of the current position of the aircraft as one or more of the targets 64 are located leftward of a current direction of travel of the aircraft. In image 82 of FIG. 13, the current altitude indicator 68 shows that the aircraft has descended to an altitude of 3,100 feet, and further indicates that the target flight path curves to the right of the current direction of travel of the aircraft as the targets 64 are located to the right of a current direction of travel of the aircraft.

The system 10 may automatically set the target altitude 66 to a minimum designated altitude, such as a minimum altitude associated with a final approach to an airport. Thus, the target altitude indicator 66 of image 82 indicates 3,100 feet, instead of 0 feet, because the system 10 detected a current minimum altitude of 3,100 feet. Thus, if the user designates a target altitude lower than a minimum altitude, the system 10 adjusts the target altitude upward to the minimum. The user may, however, adjust the altitude upward beyond the minimum.

In image 84 of FIG. 14, the system 10 has replaced the first set of targets 64 with a second set of targets 86 to indicate that the system 10 is using local positioning system data in addition to the GPS data to generate the virtual target flight path. The local positioning system may be the ILS, as explained above. The second set of targets 86 may be virtually identical to the first set of targets 64, except that the second set of targets 86 may be of a different color than the first set of targets 64 so that the user can quickly and easily identify when the system is using local positioning system data to generate the virtual target flight path.

The system 10 may use local positioning system data to generate the virtual target flight path by, for example, correcting an anticipated final approach path that was generated using navigation data from the database 18 and global positioning data collected or generated by the global positioning component 14. Exemplary methods of generating an anticipated final approach path and correcting the anticipated final approach path are described below.

As illustrated in FIG. 14, ILS data has been conventionally presented to the user via the two indicators 88,90. A first indicator 88 indicates a position of the glideslope 48 relative to a current position of the aircraft, and a second indicator 90 indicates a position of the center 40 of the runway 32 relative to the current position of the aircraft. In image 84 of FIG. 14, for example, the first indicator 88 indicates that the glideslope 48 is at a higher altitude than the current position of the aircraft, and the second indicator 90 indicates that the center 40 of the runway 32 is to the left of the current position of the aircraft. In images 92 and 96 of FIGS. 15 and 16, the indicators 88,90 indicate that the position of the aircraft is proximate the center 40 of the runway 32 and the glideslope 48. Similarly, in images 106 and 108 of FIGS. 19 and 20, the indicators 88,90 indicate that the position of the aircraft substantially corresponds to the center 40 of the runway 32 and the glideslope 48.

Image 96 of FIG. 16 presents a virtual runway 94 indicating to the pilot or other user the location of the actual runway. The virtual runway 94 is more clearly illustrated in FIGS. 17 and 18, wherein the runway 94 includes a depiction of the actual target runway 100, an enlarged representation 101 of the actual target runway 100, and may further include a depiction of one or more other features associated with the target runway 100, such as a cross runway 98. The enlarged representation 101 of the target runway 100 may generally be proportional to the target runway 100, and the size of the enlarged representation 101 may remain constant as the aircraft approaches the runway. At greater distances from the runway, the depiction of the actual runway 100 may be too small to discern while the enlarged representation is easily identified, as illustrated in image 96 of FIG. 16. As the aircraft approaches the runway, the depiction of the actual runway 100 is larger compared to the enlarged representation 101. As the aircraft approaches the runway, the size of the target runway 100 approaches the size of the enlarged representation 101. The enlarged representation 101 is eventually replaced by the target runway 100.

The virtual target flight path may not correspond perfectly with the actual approach path indicated by the local positioning system, but may represent a path toward the actual approach path. Image 96 of FIG. 16 illustrates, for example, that some of the targets 86 that appear most proximate the aircraft indicate that the virtual target flight path is straight ahead of the aircraft, while others of the targets 86 that appear more distant the aircraft indicate that the virtual target flight path slopes downwardly. Here, the system 10 determined that the current position of the aircraft is lower than the actual approach path indicated by the local positioning system, but also determined that if the aircraft continues to fly at its current altitude it will intersect the actual approach path. Therefore, the system 10 generated a virtual target flight path that includes a first segment corresponding to the aircrafts current altitude and a second segment corresponding to the downward slope of the actual approach path, wherein the second segment begins where the first segment intersects the actual approach path.

As depicted in FIG. 18, the virtual runway 94 may also include a number associated with the runway, in this case the number is "36." The number is presented to appear larger than the actual runway 100 and to appear in a plane normal to the line of sight of the user, even if the virtual runway 94 is presented to appear in a plane that is not normal to the line of the sight of the user. In other words, instead of presenting the number "36" to appear painted on the runway, the system 10 "pivots" a top of the number up and away from the ground to be more easily viewed by the user.

Images 102-108 of FIGS. 19-22 illustrate that the aircraft is substantially aligned with the virtual target flight path indicated by the targets 86, and that the virtual target flight path leads to the virtual runway 94. In particular, the actual runway 100, while difficult to discern in some of the images, can be seen at the center of the targets 86. In images 104, 110 and 112 of FIGS. 20, 23 and 24, the system 10 has removed the targets either automatically or in response to an action performed by the user. The user may wish to remove the targets 86 because, for example, the aircraft is close enough to the runway that the depiction of the actual runway 100 is large enough for the pilot to use without additional indicators. Furthermore, when the depiction of the actual runway 100 is as large or nearly as large as the enlarged representation 101, the system 10 only generates the depiction of the actual runway 100 and does not generate the enlarged representation 101.

Exemplary methods of correcting the virtual target flight path using local positioning system data, such as ILS data, are illustrated in FIGS. 25-28. A first method 124 is illustrated in FIGS. 25 and 26, wherein the system 10 generates a virtual target flight path corresponding to a desired final approach path using GPS data, and corrects the virtual target flight path using local positioning system data by adjusting the virtual target flight path relative to an anticipated anchor point. More particularly, the system 10 receives global positioning system data and generates a virtual target flight path 118 to the runway based on the global positioning system data, as depicted in blocks 126 and 128. This may also involve retrieving information relating to the desired final approach path to the runway from the database 18 and using the information to generate the virtual target flight path 118. The system 10 then presents a virtual target flight path indicator corresponding to the virtual target flight path, as depicted in block 130. When the aircraft is within range of the local positioning system it receives local positioning system data, as depicted in block 132. This may involve, for example, receiving the signals 36,38,44,46 illustrated in FIG. 3 and described above.

The system 10 determines a first difference between a current position of the aircraft and an actual approach path 120, as depicted in block 134. The system 10 may determine the first difference using local positioning system data, such as the ILS described above. As illustrated in FIG. 25, the difference between the current position of the aircraft and the actual approach path 120 will vary as the aircraft approaches the runway, wherein the magnitude of the difference is represented by radii of the circles around the aircraft at different stages of the final landing approach.

The system 10 determines a second difference between the current position of the aircraft and the virtual target flight path 118, as depicted in block 136. The system 10 determines the second difference using GPS data. If the GPS data and the published final approach path data both perfectly matched the local positioning system data, the virtual target flight path 118 and the actual approach path 120 would be the same, and no adjustments to the virtual target flight path 118 would be required. Because of discrepancies between the GPS data and the local positioning system data and/or between the published final approach path data and the local positioning system data, however, the first difference will typically not be the same as the second difference. Thus, the system 10 compares the first difference with the second difference, as depicted in block 138, and adjusts the virtual target flight path 118 so that the first difference is substantially the same as the second difference, as depicted in block 140. The system 10 may correct the virtual target flight path 118 by pivoting the path about an anchor point 122 representing an expected geographic location of an end of the final approach path, typically corresponding to an element of the ILS, a control tower, or similar feature. Upon correcting the virtual target flight path 118, the system 10 also adjusts the position of the targets 86 on the display 50.

With reference to FIGS. 27 and 28, a second exemplary method 170 of using local positioning system data to create a virtual target flight path involves using GPS data and local positioning system data to identifying an anchor point and generate the virtual target flight path from the anchor point. More specifically, the system 10 receives global positioning system data, as depicted in block 172, and receives local positioning system data, as depicted in block 174. Using both types of data, the system generates a plurality of actual flight path points, wherein each point is associated with a location determined from the GPS data and a deviation vector determined from the local positioning system data, as depicted in block 176. The deviation vector associated with each point indicates a lateral and vertical deviation from an actual approach path.

The system 10 identifies a first group of the actual flight path points that correspond to a first line, as depicted in block 178. In FIG. 27, for example, points 142, 144, 146, 148, and 150 all correspond to line 152. The system 10 may identify points as being collinear if they have deviation vectors with the same direction. The system 10 identifies a second group of the actual flight path points that correspond to a second line, as depicted in block 180. In FIG. 27, for example, points 154, 150, and 158 all correspond to line 160. The system 10 then uses the first line 152 and the second line 160 to triangulate a local positioning system source location 122, as depicted in block 182. Once the source location 122 is determined, the system 10 uses the source location 122 and at least one of the plurality of actual flight path points to calculate a virtual target flight path corresponding to an actual approach path 168 indicated by the local positioning system, as depicted in block 184. The source location 122 is used as the anchor point of the actual approach path. Although any of the plurality of actual flight path points may be used to calculate the virtual target flight path, the system 10 may identify various points 162,164,168 that have deviation vectors of 0 and thus correspond to the actual approach path 168.

Referring again to the method 124 depicted in FIGS. 25 and 26, the system 10 may generate the anticipated final approach path 118 using global positioning system data and data from the database 18. By way of example, the system 10 may generate the anticipated final approach path 118 by calculating an anticipated localizer vector, an anticipated glideslope vector, and an anticipated anchor point.

With reference to FIG. 29, an anticipated localizer vector may be calculated using a series of localizer calculations that generally determine a localizer plane containing a first vector 192 that corresponds to a localizer outbound course and is located in the local tangent plane, and a second vector 190 normal to the local tangent plane. The localizer plane may be defined by a point representing the localizer and a vector 188 perpendicular to the localizer plane. For these calculations, the local tangent plane may be calculated such that it is centered, for example, at the glideslope transmitter position.

Equation (1) may be used to determine the location and direction of the vector 188:

$$\text{loc\_norm} = \frac{[(\text{lcl\_n} \times \cos(\text{loc\_otbd})) + (\text{lcl\_e} \times \sin(\text{loc\_otbd}))] \times (\text{lcl\_u})}{|[(\text{lcl\_n} \times \cos(\text{loc\_otbd})) + (\text{lcl\_e} \times \sin(\text{loc\_otbd}))] \times (\text{lcl\_u})|} \quad (1)$$

where loc_norm is the vector 130;

loc_otbd is the opposite of the localizer inbound course, in radians, relative to true north;

lcl_n is a unit vector in the local tangent plane in the direction of true north;

lcl_e is a unit vector in the local tangent plane in the direction of true east;

lcl_u is a unit vector perpendicular to the local tangent plane; and the final "x" in the numerator and the final "x" in the denominator both represent vector cross product operations, while each remaining "x" represents a multiply operation.

With reference to FIG. 30, the anticipated glideslope vector may be calculated using a series of calculations that generally determine a glideslope plane containing a first vector 196 along the localizer outbound course and at an angle to the local tangent plane equivalent to the glideslope angle, and a second vector (not shown) in the local tangent plane. The glideslope plane is defined by a point representing the glideslope transmitter and a vector 194 perpendicular to the glideslope plane. For these calculations, the local tangent plane may be calculated, for example, such that it is centered at the glideslope transmitter position.

Equations (2), (3), and (4) may be used to determine the vector 194:

$$\text{loc\_vec} = \frac{(\text{lcl\_n} \times \cos(\text{loc\_otbd})) + (\text{lcl\_e} \times \sin(\text{loc\_otbd}))}{|(\text{lcl\_n} \times \cos(\text{loc\_otbd})) + (\text{lcl\_e} \times \sin(\text{loc\_otbd}))|} \quad (2)$$

$$\text{bm\_fwd} = \frac{(\text{loc\_vec} \times \cos(\text{gs\_ang})) + (\text{lcl\_u} \times \sin(\text{gs\_ang}))}{|(\text{loc\_vec} \times \cos(\text{gs\_ang})) + (\text{lcl\_u} \times \sin(\text{gs\_ang}))|} \quad (3)$$

$$\text{gs\_norm} = \frac{(\text{bm\_fwd} \times \text{lcl\_u}) \times \text{bm\_fwd}}{|(\text{bm\_fwd} \times \text{lcl\_u}) \times \text{bm\_fwd}|} \quad (4)$$

where gs_norm is the vector 194;

loc_vec is a vector originating at the glideslope transmitter, along the localizer outbound course, in the local tangent plane;

bm_fwd is a vector originating at the glideslope transmitter, along the localizer outbound course, and at an angle to the local tangent plane equivalent to the glideslope angle; and each "x" in equation (4) represents a vector cross product operation.

With reference to FIG. 31, an anticipated anchor point may be calculated using a series of calculations that generally determine the point on the runway at which the actual approach path indicated by the information landing system terminates. The anchor point is the intersection of the localizer plane, represented by line 198, the glideslope plane 200, represented by line 200 (both as determined above), and the local tangent plane at the glideslope position, represented by line 202. Line 204 represents the anticipated final approach path constructed from the anchor point, the localizer plane, the glideslope plane, and the local tangent plane. The anchor point (ANC) may be determined using equation (5):

$$ANC = \begin{bmatrix} \text{loc\_norm} \\ \text{gs\_norm} \\ \text{lcl\_u} \end{bmatrix}^{-1} \times \begin{bmatrix} \text{loc\_norm} \times LOC \\ \text{gs\_norm} \times GS \\ \text{lcl\_u} \times GS \end{bmatrix} \quad (5)$$

where each "x" in the right-most matrix represents a vector dot product operation.

A unit vector in the direction of the actual ILS beam, including deviation information received from the ILS, represents the actual desired approach path and may be determined using either equation (6) or equation (7) as follows:

$$\text{path} = \frac{(\text{dev\_f} \times \cos(vdev)) + (\text{dev\_u} \times \sin(vdev))}{|(\text{dev\_f} \times \cos(vdev)) + (\text{dev\_u} \times \sin(vdev))|} \quad (6)$$

$$\text{path} = \frac{\text{path} + (\text{dev\_r} \times \sin(ldev))}{|\text{path} + (\text{dev\_r} \times \sin(ldev))|} \quad (7)$$

The variable vdev is the angular vertical deviation from the glideslope receiver, expressed in radians. The variable ldev is the angular vertical deviation from the localizer receiver, expressed in radians. The variable dev_u represents a unit vector perpendicular to both dev_f and dev_r, and may be determined using equations (8), (9), and (10) as follows:

$$\text{dev\_u} = \frac{\text{dev\_f} \times \text{dev\_r}}{|\text{dev\_f} \times \text{dev\_r}|} \quad (8)$$

$$\text{dev\_r} = \frac{\text{gnd\_u} \times \text{dev\_f}}{|\text{gnd\_u} \times \text{dev\_f}|} \quad (9)$$

$$\text{dev\_f} = \frac{\text{anc\_dev}}{|\text{anc\_dev}|} \quad (10)$$

The variable anc_dev in equation (10) represents a vector from the point ANC to the point LCL (the aircraft's present position):

$$anc\_dev = LCL - ANC \quad (11)$$

As used herein, a "local tangent plane" is a plane that is tangential to the earth at a designated point, such as a point corresponding to a glideslope transmitter position.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of assisted aerial navigation, said method comprising:
receiving global navigation satellite system signals;
receiving local positioning system signals;
generating a virtual target flight path for an aircraft using said global navigation satellite system signals and said local positioning system signals; and
presenting, on an avionics display, a virtual target flight path indicator corresponding to said virtual target flight path to assist an operator in operating the aircraft.

2. The method as set forth in claim 1, further comprising receiving said wireless global navigation satellite system signals directly from a plurality of global navigation satellite system satellites and generating global navigation satellite system data from said signals.

3. The method as set forth in claim 1, further comprising receiving said wireless local positioning system signals directly from at least one local positioning system transmitter and generating local positioning system data from said signals.

4. The method as set forth in claim 3, wherein said local positioning system data is instrument landing system data.

5. The method as set forth in claim 1, further comprising presenting a plurality of target outlines as part of said virtual target flight path indicator, wherein each outline corresponds to a different portion of said virtual target flight path.

6. The method as set forth in claim 5, further comprising fading out a proximate target outline representing a proximate portion of said flight path, and fading in a distal target outline representing a distal portion of said flight path.

7. The method as set forth in claim 1, further comprising receiving a target flight path characteristic from said operator and adjusting said virtual target flight path based on said target flight path characteristic in substantially real time.

8. The method as set forth in claim 7, wherein said target flight path characteristic includes altitude.

9. The method as set forth in claim 1, wherein said virtual target flight path represents a flight path toward an ideal path indicated by said local positioning system signals, and wherein at least a portion of said virtual target flight does not correspond to said ideal path.

10. The method as set forth in claim 1, further comprising generating said virtual target flight path using said global navigation satellite system signals, detecting an error in said virtual target flight path based on said local positioning system signals, and adjusting said virtual target flight path to correct said error.

11. The method as set forth in claim 10, further comprising repeatedly detecting said error in said virtual flight path and adjusting said virtual target flight path to correct said error, all in real time.

12. The method as set forth in claim 1, further comprising using said global navigation satellite system signals and said local positioning system signals to triangulate a local positioning system signal source location, and using said source location and said local positioning system signals to generate said virtual target flight path.

13. The method as set forth in claim 1, further comprising generating a virtual representation of a ground surface depicting actual ground features within the operator's view, and generating an enlarged representation of a runway on said ground surface, wherein a size of said enlarged representation remains substantially constant as a distance to said runway changes.

14. A method of assisted aerial navigation, said method comprising:
   accessing a navigational database;
   receiving global navigation satellite system signals and determining a virtual target flight path to a runway corresponding to a final approach path defined in said navigation database, wherein said virtual target flight path is determined by calculating a localizer vector, calculating a glideslope vector, and calculating an anchor point;
   generating a virtual target flight path indicator corresponding to said virtual target flight path for presentation on an avionics display to assist an operator in operating the aircraft;
   receiving instrument landing system signals from an instrument landing system, wherein said instrument landing system signals indicate a first difference between a current position and an actual final approach path;
   determining a second difference between said virtual target flight path and a current position of said aircraft based on said global navigation satellite system signals; and
   comparing said first difference with said second difference and adjusting said virtual target flight path so that said first difference is substantially the same as said second difference.

15. The method as set forth in claim 14, further comprising receiving a target flight path characteristic from said operator and adjusting said virtual target flight path based on said target flight path characteristic in substantially real time.

16. The method as set forth in claim 15, wherein said target flight path characteristic includes altitude.

17. The method as set forth in claim 14, further comprising adjusting said virtual target flight path so that said first difference is substantially the same as said second difference by pivoting said virtual target flight path about an anticipated anchor point.

18. The method as set forth in claim 14, further comprising generating a virtual representation of a ground surface depicting actual ground features within the operator's view, and generating an enlarged representation of a runway on said ground surface, wherein a size of said enlarged representation remains substantially constant as a distance to said runway changes.

19. The method as set forth in claim 14, wherein said virtual target flight path indicator includes a plurality of outlines presented on the avionics display and demonstrating a flight path corresponding to said virtual target flight path, wherein each of said plurality of outlines corresponds to a different portion of said flight path such that a first outline representing a more proximate portion of said flight path appears larger than a second outline representing a more distant portion of said flight path.

20. The method as set forth in claim 19, further comprising fading out a proximate target outline representing a proximate portion of said flight path, and fading in a distal target outline representing a distal portion of said flight path.

21. A method of assisted aerial navigation, said method comprising:
   receiving instrument landing system data from an instrument landing system;
   receiving global navigation satellite system signals from a global positioning system;
   generating a plurality of flight path points using said instrument landing system data and said global navigation satellite system signals, wherein each flight path point corresponds to a GPS location and to an instrument landing system deviation vector;
   identifying a first plurality of said flight path points corresponding to a first direction of deviation from an approach path;
   identifying a second plurality of said flight path points corresponding to a second direction of deviation from said approach path;
   using said first plurality of flight path points and said second plurality of deviation points to triangulate a position of an approach path anchor;
   using said approach path anchor and at least one of said flight path points to generate a virtual target flight path corresponding to a final approach path defined by said instrument landing system data; and
   generating a virtual target flight path indicator corresponding to said virtual target flight path for presentation on an avionics display to assist an operator in operating an aircraft.

22. The method as set forth in claim 21, further comprising generating a virtual representation of a ground surface depicting actual ground features within the operator's view, and generating an enlarged representation of a runway on said ground surface, wherein a size of said enlarged representation remains substantially constant as a distance to runway changes.

23. The method as set forth in claim 21, wherein said virtual target flight path indicator includes a plurality of outlines presented on the avionics display and demonstrating a flight path corresponding to said virtual target flight path, wherein each of said plurality of outlines corresponds to a different portion of said flight path such that a first outline representing a more proximate portion of said flight path appears larger than a second outline representing a more distant portion of said flight path.

24. The method as set forth in claim 23, further comprising fading out a proximate target outline representing a proximate portion of said flight path, and fading in a distal target outline representing a distal portion of said flight path.

25. A system for aerial navigation, said system comprising:
   a user interface;
   a global positioning component for receiving global positioning system signals and generating global positioning system data;
   a local positioning component for receiving local positioning system signals and generating local positioning system data;
   a processing system for generating a virtual target flight path using said global positioning system data and said local positioning system data, and for presenting a virtual target flight path indicator on said user interface, wherein said virtual target flight path indicator corresponds to said virtual target flight path.

26. The system as set forth in claim 25, wherein said processing system generates said virtual target flight path using said global positioning system data, detects an error in said virtual target flight path based on said local positioning system data, and adjusts said virtual target flight path to correct said error.

27. The system as set forth in claim 26, wherein said processing system repeatedly detects said error in said virtual flight path and adjusts said virtual target flight path to correct said error, all in real time.

28. The system as set forth in claim 25, wherein said processing system uses said global positioning system data and said local positioning system data to triangulate a local positioning system signal source location, and uses said source location and said local positioning system data to generate said virtual target flight path.

29. The system as set forth in claim 25, wherein said processing system generates a virtual representation of a ground surface depicting actual ground features within a pilot's view, and generates an enlarged representation of a runway on said ground surface, wherein a size of said enlarged representation remains substantially constant as a distance to said runway changes.

30. The system as set forth in claim 25, wherein said virtual target flight path indicator includes a plurality of outlines presented on a flight display and demonstrating a flight path corresponding to said virtual target flight path, wherein each of said plurality of outlines corresponds to a different portion of said flight path such that a first outline representing a more proximate portion of said flight path appears larger than a second outline representing a more distant portion of said flight path.

\* \* \* \* \*